United States Patent
Leedham

(10) Patent No.: US 12,407,272 B2
(45) Date of Patent: Sep. 2, 2025

(54) CELL ASSEMBLY AND CONVERTER COMPRISING A PLURALITY OF ARMS, EACH HAVING SUCH A CELL ASSEMBLY

(71) Applicant: Maschinenfabrik Reinhausen GmbH, Regensburg (DE)

(72) Inventor: Robert John Leedham, Cambridge (GB)

(73) Assignee: MASCHINENFABRIK REINHAUSEN GMBH, Regensburg (DE)

( * ) Notice: Subject to any disclaimer, the term of this patent is extended or adjusted under 35 U.S.C. 154(b) by 193 days.

(21) Appl. No.: 18/002,067

(22) PCT Filed: May 27, 2021

(86) PCT No.: PCT/EP2021/064167
§ 371 (c)(1),
(2) Date: Dec. 19, 2022

(87) PCT Pub. No.: WO2022/002492
PCT Pub. Date: Jan. 6, 2022

(65) Prior Publication Data
US 2023/0231495 A1     Jul. 20, 2023

(30) Foreign Application Priority Data
Jun. 29, 2020   (EP) .................................... 20182875

(51) Int. Cl.
*H02M 7/483*   (2007.01)
*H02M 1/32*    (2007.01)
*H02M 7/5387*  (2007.01)

(52) U.S. Cl.
CPC ......... *H02M 7/4835* (2021.05); *H02M 1/325* (2021.05); *H02M 7/53871* (2013.01)

(58) Field of Classification Search
CPC ........ H02M 7/00; H02M 7/02; H02M 7/1552; H02M 7/162; H02M 7/219; H02M 7/42;
(Continued)

(56) References Cited

U.S. PATENT DOCUMENTS 6,222,284 B1    4/2001  Hammond et al.
9,425,705 B2 *  8/2016  Zargari ................... H02M 1/32
(Continued)

FOREIGN PATENT DOCUMENTS

JP    2000060142 A    2/2000
JP    2019092333 A    6/2019
(Continued)

*Primary Examiner* — Thienvu V Tran
*Assistant Examiner* — Carlos O Rivera-Perez
(74) *Attorney, Agent, or Firm* — LEYDIG, VOIT & MAYER, LTD.

(57) ABSTRACT

Each cell of a cell assembly for a converter may include: first and second terminals, switching elements, and a capacitor. The cells are connected in series such that, for each pair of neighbouring cells, the first terminal of a first cell is connected to the second terminal of a second cell. Each cell includes a bypass connected to the first and second terminals that bypasses switching elements in a short circuit configuration and does not bypass the switching elements in an open circuit configuration. Each cell has a cell controller providing control signals to the switching elements to connect the capacitor to the first and second terminals or to bypass the capacitor. The cell controller provides a control signal to the bypass unit of neighbouring cells to change its configuration between the short circuit and open circuit configurations.

14 Claims, 14 Drawing Sheets

(58) Field of Classification Search
CPC .......... H02M 7/44; H02M 7/48; H02M 7/483;
H02M 7/4833; H02M 7/4835; H02M
7/4837; H02M 7/487; H02M 7/49; H02M
7/5387; H02M 7/53871; H02M 1/0067;
H02M 1/007; H02M 1/0074; H02M
1/0085; H02M 1/0095; H02M 1/32;
H02M 1/325; H02M 1/08; H02M 1/084;
H02M 1/0006
USPC ... 363/34, 35, 37, 40–43, 50–58, 65, 71, 72,
363/131–134; 323/219, 273–276,
323/282–285, 351; 361/18, 54–61
See application file for complete search history.

(56) References Cited

U.S. PATENT DOCUMENTS

| | | | |
|---|---|---|---|
| 2003/0183838 A1* | 10/2003 | Huang | H03K 17/08148 |
| | | | 257/107 |
| 2010/0056710 A1 | 3/2010 | Oshima | |
| 2014/0042817 A1 | 2/2014 | Zargari et al. | |
| 2015/0333660 A1* | 11/2015 | Kim | H02M 7/483 |
| | | | 363/123 |
| 2016/0056710 A1 | 2/2016 | Häfner et al. | |
| 2019/0296654 A1 | 9/2019 | Azidehak et al. | |

FOREIGN PATENT DOCUMENTS

| | | |
|---|---|---|
| WO | WO 2010145688 A1 | 12/2010 |
| WO | WO 2015136682 A1 | 9/2015 |
| WO | WO 2015155112 A1 | 10/2015 |
| WO | WO 2019003290 A1 | 1/2019 |

* cited by examiner

CELL ASSEMBLY AND CONVERTER COMPRISING A PLURALITY OF ARMS, EACH HAVING SUCH A CELL ASSEMBLY

CROSS REFERENCE TO RELATED APPLICATIONS

This application is a U.S. National Phase application under 35 U.S.C. § 371 of International Application No. PCT/EP2021/064167, filed on May 27, 2021, and claims benefit to European Patent Application No. EP 20182875.3, filed on Jun. 29, 2020. The International Application was published in English on Jan. 6, 2022 as WO 2022/002492 A1 under PCT Article 21(2).

FIELD

The present disclosure relates to a cell assembly and a converter comprising a plurality of arms, each having such a cell assembly.

BACKGROUND

Converters may have a plurality of arms, each having a cell assembly.

In electric power transmission systems, converters are used, which may also be referred to as power converters. Usually, these converters comprise a plurality of arms, also known as phase arms. Each arm of these arms comprises a cell assembly and each cell assembly comprises a plurality of cells. Each cell of the plurality of cells comprises a first terminal, a second terminal, switching elements, and a capacitance. The switching elements are adapted to connect the capacitance to the first terminal and to the second terminal and to bypass the capacitance, such that a voltage provided by the capacitance can be selectively provided by the first terminal and the second terminal. The multiple cells are connected in series in such a way that, for each pair of neighbouring cells, the first terminal of a first cell of the pair of neighbouring cells is connected to the second terminal of a second cell of the pair of neighbouring cells.

Even though the cells of the cell assemblies in the state of the art are generally robust in design, a failure of at least a part of a cell, i.e. a cell failure, can occur.

Generally, cells may be adapted such that when a certain switching element fails, the cell is bypassed, since the failed switching element provides a bypass for the cell, such that in certain failure modes the operability of the converter is ensured. In the context of the present disclosure a failure mode is a cause of cell failure, which can also be referred to as one possible way the cell can fail. However, the cell is only bypassed in case the right switching element fails, and, therefore, it is not possible to reliably bypass the cell in different cell failure modes. Further, switching elements, which fail such that the failed switching element provides a bypass, are often inefficient, especially due to high switching losses, and expensive. Particularly in high voltage applications, in which the switching elements perform a plurality of switching operations, switching losses should be kept to a minimum.

A further attempt to ensure the operability of the converter in case of a cell failure is that, each cell may comprise a bypass unit, which is adapted to stay operational in many cell failure modes and ensures that the cell can be bypassed such that a cell failure does not result in a failure of the converter. Usually, each such cell comprises a cell controller unit, which is adapted to provide control signals to the switching elements of the cell and to the bypass unit of the cell. Further, the converter usually comprises a main controller unit, which is adapted to provide control signals to the cell controller units of the cells. In case a cell failure is so severe that the cell controller unit fails or the communication between the cell controller unit and the bypass unit of the cell or between the main controller unit of the converter and the cell controller unit is impaired or no longer possible, control signals can no longer—or at least not reliably—be provided by the cell controller unit to the bypass unit of the cell and/or from the main controller unit of the converter to the cell controller unit. Therefore, in such a case, the controllability of the cell, particularly of the bypass unit of the cell, and the reliable functioning of the converter is impaired. This is particularly disadvantageous when a cell fails during start-up of the converter.

SUMMARY

In an embodiment, the present disclosure provides a cell assembly that has a plurality of cells. Each cell of the plurality of cells includes: a first terminal, a second terminal, switching elements, and a capacitor. The switching elements are adapted to controllably: connect the capacitor to the first terminal and to the second terminal and bypass the capacitor. The cells of the plurality of cells are connected in series in such a way that, for each pair of neighbouring cells, the first terminal of a first cell of the pair of neighbouring cells is connected to the second terminal of a second cell of the pair of neighbouring cells. Each cell further includes a bypass unit, the bypass unit of each cell being connected to the first terminal and to the second terminal of the cell and adapted to controllably bypass at least one switching element of the switching elements of the cell in a short circuit configuration and to not bypass the at least one switching element in an open circuit configuration. Each cell further includes a cell controller, the cell controller of each cell is adapted to provide control signals to the switching elements of the cell, such that the switching elements controllably connect the capacitor to the first terminal and to the second terminal or the switching elements bypass the capacitor. The cell controller of each cell is also adapted to provide a control signal to the bypass unit of at least one of its neighbouring cells, such that the respective bypass unit controllably changes its configuration from the short circuit configuration to the open circuit configuration or from the open circuit configuration to the short circuit configuration.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

Figure 1:
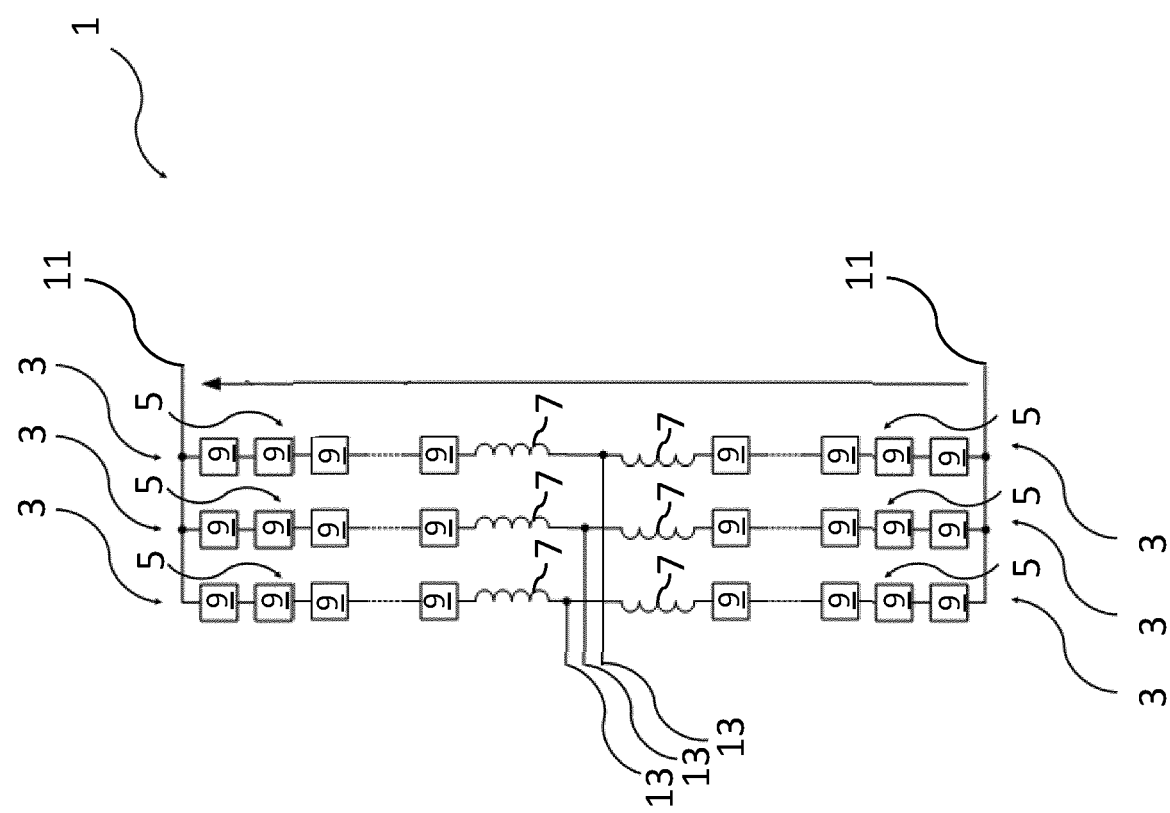
FIG. 1 schematically shows a section of a first embodiment of a converter comprising a plurality of arms.

Generally, a reliable functioning converter is desirable.

Therefore, aspects of the present disclosure provide a reliable functioning converter.

According to a first aspect of the present disclosure, an advantageous cell assembly is provided. This advantageous cell assembly comprises a plurality of cells. Each cell of the plurality of cells comprises a first terminal, a second terminal, switching elements, and a capacitance. The switching elements are adapted to connect the capacitance to the first terminal and to the second terminal and to bypass the capacitance. The cells of the plurality of cells are connected in series in such a way that, for each pair of neighbouring cells, the first terminal of a first cell of the pair of neighbouring cells is connected to the second terminal of a second cell of the pair of neighbouring cells. Each cell further comprises a bypass unit. The bypass unit of each cell is connected to the first terminal and to the second terminal of the cell. Further, the bypass unit of each cell is adapted to bypass at least one switching element of the switching elements of the cell in a short circuit configuration and to not bypass the at least one switching element in an open circuit configuration. Further, each cell comprises a cell controller unit. The cell controller unit of each cell is adapted to provide control signals to the switching elements of the cell, such that the switching elements connect the capacitance to the first terminal and to the second terminal or the switching elements bypass the capacitance. Further, the cell controller unit of each cell is adapted to provide a control signal to the bypass unit of at least one of its neighbouring cells, such that the respective bypass unit changes its configuration from the short circuit configuration to the open circuit configuration or from the open circuit configuration to the short circuit configuration.

A cell assembly may include a plurality of cells. Each cell of the plurality of cells may comprise a half-bridge configuration. In case a cell comprises a half-bridge configuration, the cell can block voltage in one direction. Particularly, in case a cell comprises a half-bridge configuration, the cell forms a two level converter cell either connecting its capacitance to its first terminal and to its second terminal and thereby providing the voltage of its capacitance at its first terminal and second terminal or bypassing the capacitance and thereby not providing the voltage of its capacitance at its first terminal and second terminal. A half-bridge configuration is particularly preferred in case the number of switching elements and power losses occurring during switching operation of the switching elements should be kept low. Further, each cell of the plurality of cells may comprise a full-bridge configuration. In case a cell comprises a full-bridge configuration, the cell can block voltage in two directions. Particularly, in case a cell comprises a full-bridge configuration, the cell forms a three level converter cell connecting its capacitance to its first terminal and to its second terminal in either polarity and thereby providing the voltage of its capacitance at its first terminal and second terminal in either polarity or bypassing the capacitance and thereby not providing the voltage of its capacitance at its first terminal and second terminal. A full-bridge configuration is particularly preferred in case the capacitance should be connected to the first terminal and the second terminal in either polarity. Connecting the capacitance to the first terminal and the second terminal in either polarity improves the controllability of the converter according to the second aspect of the present disclosure.

Each cell of the plurality of cells may include a first terminal and a second terminal. The first terminal and the second terminal are each adapted to be connected to a terminal of a neighbouring cell, such that the plurality of cells can be connected in series. Further, each cell of the plurality of cells may include switching elements. Preferably, each switching element of the switching elements is adapted to assume a closed configuration, in which an electric working current can flow through the switching element, and an open configuration, in which the electric working current cannot flow through the switching element. Further, each switching element of the switching elements may be adapted to change between the closed and open configurations, i.e. from the closed configuration to the open configuration and from the open configuration to the closed configuration, during a switching operation. Further, each cell of the plurality of cells comprises a capacitance. Preferably, the capacitance of each cell is provided by one capacitor or by multiple capacitors.

The switching elements may be adapted to connect the capacitance to the first terminal and to the second terminal and to bypass the capacitance. Preferably, the switching elements are adapted such that by performing switching operations of the switching elements, the switching elements can alternately after another connect the capacitance to the first terminal and to the second terminal and to bypass the capacitance, such that the voltage of the capacitance is provided at the first terminal and second terminal and not provided at the first terminal and second terminal one after another.

The cells of the plurality of cells may be connected in series in such a way that, for each pair of neighbouring cells, the first terminal of a first cell of the pair of neighbouring cells is connected to the second terminal of a second cell of the pair of neighbouring cells. Due to the series connection of the cells, coordinated switching operations of the switching elements allows to selectively connect the capacitances of the cells to the first and second terminals of the cells, which allows to provide a stepped voltage waveform that approximates very closely the waveform of a sine wave with only a minimum of harmonic distortion at each arm of the converter and thereby at each AC (alternating current) terminal of the converter.

Each cell may further includes a bypass unit. The bypass unit of each cell is connected to the first terminal and to the second terminal of the cell and adapted to bypass at least one switching element of the switching elements of the cell in a short circuit configuration and to not bypass the at least one switching element in an open circuit configuration. Depending on the configuration of the cell, such as the half-bridge configuration and the full-bridge configuration, the bypass unit may be adapted to bypass one switching element or more than one switching element. In an embodiment of the cell assembly, in which the cell comprises a half-bridge configuration, the bypass unit may be adapted to bypass one switching element. Further, in an embodiment of the cell assembly, in which the cell comprises a full-bridge configuration, the bypass unit may be adapted to bypass two switching elements. Therefore, the bypass unit may be adapted to selectively bypass the at least one switching element, and, thereby, provides a bypass of the cell in case of a cell failure. Regarding the terminology used in this paragraph with respect to bypassing at least one switching element, it is noted that the bypass unit is connected to the first terminal and to the second terminal, and, thereby, the bypass unit directly connects the first terminal and the second terminal to each other essentially in the fashion of a short circuit when the bypass unit is in the short circuit configuration. In case one switching element is connected to the first terminal and to the second terminal, the bypass unit is regarded to be adapted to bypass this switching element. In case two switching elements are connected to the first terminal and to the second terminal, for example in a series connection to each other, the bypass unit is regarded to be adapted to bypass the two switching elements. Therefore, the bypass unit provides a means for bypassing the cell when the bypass unit is in the short circuit configuration. When, in the context of the present disclosure, it is referred to that the bypass unit bypasses the cell, it is preferably meant that the bypass unit is in the short circuit configuration, i.e. a direct connection between the first terminal and the second terminal is provided by the bypass unit essentially in the fashion of a short circuit.

Each cell may further include a cell controller unit. The cell controller unit of each cell is adapted to provide control signals to the switching elements of the cell, such that the switching elements connect the capacitance to the first terminal and to the second terminal or the switching elements bypass the capacitance. Since the cell controller unit of each cell is adapted to provide control signals to the switching elements of the cell, such that the switching elements connect the capacitance to the first terminal and to the second terminal or the switching elements bypass the capacitance, the cell controller unit allows coordinated switching operations at the switching elements of the cell, such that the voltage of the capacitance can selectively be provided at the first terminal and second terminal and not provided at the first terminal and second terminal in a controlled manner.

The cell controller unit of each cell is adapted to provide a control signal to the bypass unit of at least one of its neighbouring cells. Since the cell controller unit of each cell is adapted to provide a control signal to the bypass unit of at least one of its neighbouring cells, the cell controller unit of each cell can control the bypass unit of at least one of its neighbouring cells. Preferably, the cell controller unit of each cell is adapted to provide a control signals to the bypass unit of one of its neighbouring cells. Further, it is particularly preferred that the cell controller unit of each cell is adapted to provide control signals to two of its neighbouring cells. The cell controller unit of each cell is adapted to provide a control signal to the bypass unit of at least one of its neighbouring cells, such that the respective bypass unit changes its configuration from the short circuit configuration to the open circuit configuration or from the open circuit configuration to the short circuit configuration. Since the cell controller unit of each cell is adapted to provide a control signal to the bypass unit of at least one of its neighbouring cells, such that the respective bypass unit changes its configuration from the short circuit configuration to the open circuit configuration or from the open circuit configuration to the short circuit configuration, the cell controller unit of each cell can control the bypass unit of at least one of the neighbouring cells of the cell the controller unit is a part of. For example, in case a cell failure is so severe that the cell controller unit fails or the communication between the cell controller unit and the bypass unit of the cell or between the main controller unit of the converter and the cell controller unit is impaired or no longer possible, control signals can be provided by the cell controller unit of a neighbouring cell of the failed cell to the bypass unit of the failed cell. Therefore, the controllability of the failed cell, particularly of the bypass unit of the failed cell, and, therefore, the reliable functioning of the converter is improved. This is particularly advantageous when a cell fails during start-up of the converter.

Preferably, the bypass unit may comprise at least one thyristor. In case the bypass unit comprises at least one thyristor, the cell controller unit of each cell may be adapted to provide a control signal to the at least one thyristor of the bypass unit of at least one of its neighbouring cells, such that the respective bypass unit changes its configuration from the short circuit configuration to the open circuit configuration or from the open circuit configuration to the short circuit configuration. Especially, when the cell controller unit of each cell is adapted to provide a control signal to the at least one thyristor of the bypass unit, the configuration of the at least one thyristor can be changed from a short circuit configuration of the at least one thyristor to an open circuit configuration of the at least one thyristor and from the open circuit configuration of the at least one thyristor to the short circuit configuration of the at least one thyristor based on the control signals received by the at least one thyristor from the cell controller unit.

Particularly, since the bypass unit of a cell can be controlled by a cell controller unit of a neighbouring cell, the reliability of the converter is improved. Further, problems arising during start-up of the converter when a cell fails or a communication with a cell fails are significantly reduced, which also improves the reliability of the converter. Further, since the bypass unit of a cell can be controlled by a cell controller unit of a neighbouring cell, the configuration of the bypass unit can be changed by the cell controller unit of the neighbouring cell during start-up of the converter, which also allows testing of the cells during start-up of the converter. The testing of the cells during start-up allows to identify failed cells and disable, e.g. bypass, the failed cells during start-up, such that the failed cells can stay disabled during the operation of the converter.

Implementations of the cell assembly according to the first aspect of the present disclosure, therefore, improve the reliable functioning of a converter.

Preferably, the cell controller unit of each cell is adapted to provide control signals to the bypass unit of the cell the cell controller is a part of, such that the bypass unit changes its configuration from the short circuit configuration to the open circuit configuration or from the open circuit configuration to the short circuit configuration. When the cell controller unit of each cell is adapted to provide control signals to the bypass unit of the cell the cell controller is a part of, such that the bypass unit changes its configuration from the short circuit configuration to the open circuit configuration or from the open circuit configuration to the short circuit configuration, the configuration of the bypass unit of the cell can be changed by the cell controller unit of the same cell.

According to a preferred embodiment of the cell assembly, each cell further comprises a power supply unit, wherein the power supply unit of each cell is adapted to provide electrical power to the bypass unit of at least one of its neighbouring cells. Since the power supply unit of each cell is adapted to provide electrical power to the bypass unit of at least one of its neighbouring cells, the power supply of the bypass unit of the at least one of the neighbouring cells is ensured even if the power supply unit of the at least one neighbouring cells has failed in case of a cell failure. Preferably, each power supply unit is adapted to provide electrical power to the bypass unit of the cell the power supply unit is a part of. Further, it is preferred that each power supply unit is adapted to provide electrical power to the controller unit of the cell the power supply unit is a part of Particularly, each power supply unit is adapted to provide electrical power to the capacitance of the cell the power supply unit is a part of.

According to a preferred embodiment of the cell assembly, the bypass unit of each cell comprises a memory unit. Preferably, the memory unit is adapted to store information on the configuration of the bypass unit, e.g. status information of the bypass unit, such that by accessing the memory unit, e.g. from the cell controller unit of the cell or from a cell controller unit of a neighbouring cell or from the main controller unit of the converter, the configuration of the bypass unit can be inferred. Preferably, the memory unit is adapted to provide information on the configuration of the bypass unit, even after no electrical power has been provided by the power supply unit of the cell to the bypass unit of the cell for a certain period of time. Hence, the memory unit allows to infer the configuration of the bypass unit prior to the period of time during which no electrical power has been provided by the power supply unit of the cell to the bypass unit of the cell. After this period of time, the bypass unit can then be changed back to or be kept in the configuration of the bypass unit prior to the period of time. In a particular preferred embodiment of the cell assembly, the memory unit of the bypass unit of each cell may preserve the configuration of the bypass unit of the cell from prior the period of time during the period of time such that during and after the period of time the bypass unit maintains its configuration from prior to the period of time. This can, for example, be achieved, when the memory unit comprises a latching relay, as described further below.

According to a preferred embodiment of the cell assembly, the memory unit of each cell is connected to the cell controller unit of the cell, such that a status information of the bypass unit, which represents the configuration of the bypass unit, can be written to the memory unit by the cell controller unit of the cell. The control signals received by the bypass unit from the cell controller unit may represent status information, which can be written to the memory unit by the cell controller unit of the cell. The status information may represent the configuration of the bypass unit, particularly the current configuration of the bypass unit and/or the desired configuration of the bypass unit. In case the status information represents the configuration of the bypass unit, the status information may also be called status information of the bypass unit. Preferably, the current configuration of the bypass unit is the configuration in which the bypass unit is currently in. Similarly, it is preferred that the desired configuration of the bypass unit may be the configuration in which the bypass unit needs to be in, such that the at least one switching element of the switching elements is bypassed or not bypassed, depending on the situation.

According to a preferred embodiment of the cell assembly, the memory unit comprises a data storage unit. Preferably, the data storage unit is adapted to retain digital data, especially the status information of the bypass unit.

According to a preferred embodiment of the cell assembly, the data storage unit is a non-volatile data storage unit. A non-volatile data storage unit it particularly preferred if the status information of the bypass unit is to be retrieved after the memory unit of the cell has been power cycled.

According to a preferred embodiment of the cell assembly, the memory unit comprises a latching relay. A latching relay is particularly preferred when the memory unit of the bypass unit of each cell may preserve the configuration of the bypass unit of the cell from prior a period of time during which no electrical power has been provided by the power supply unit of the cell to the bypass unit of the cell, during this period of time such that during and after the period of time the bypass unit maintains its configuration from prior to the period of time. The latching relay may comprise input terminals adapted to receive control signals from the cell controller unit and normally open contact terminals adapted to be in an open configuration and in a closed configuration and changed from the open configuration to the closed configuration and from the closed configuration to the open configuration depending on the control signals received from the cell controller unit, such that the configuration of a thyristor can be changed from a short circuit configuration to an open circuit configuration and from the open circuit configuration to the short circuit configuration.

According to a preferred embodiment of the cell assembly, the cell controller unit of each cell is adapted to provide a control signal to the bypass unit of one of its neighbouring cells, such that the respective bypass unit changes its configuration from the short circuit configuration to the open circuit configuration or from the open circuit configuration to the short circuit configuration. Since the cell controller unit of each cell is adapted to provide a control signal to the bypass unit of one of its neighbouring cells, such that the bypass unit of the one of the neighbouring cells Changes its configuration from the short circuit configuration to the open circuit configuration or from the open circuit configuration to the short circuit configuration, the cell controller unit of each cell can control the bypass unit of the one of the neighbouring cells of the cell the controller unit is a part of. It is particularly preferred that the bypass unit of each cell is provided with control signals from the cell controller unit of the cell and in addition provided with control signals from the cell controller unit of one neighbouring cell. Therefore, in case the cell controller unit of a cell fails or the communication between the cell controller unit and the bypass unit of the cell or between the main controller unit of the converter and the cell controller unit of the cell is impaired or no longer possible, control signals can be provided by the cell controller unit of the one neighbouring cell of the failed cell to the bypass unit of the failed cell. It is preferred that when the cell controller unit of each cell is adapted to provide a control signal to the bypass unit of one of its neighbouring cells, such that the respective bypass unit changes its configuration from the short circuit configuration to the open circuit configuration or from the open circuit configuration to the short circuit configuration, the power supply unit of each cell is adapted to provide electrical power to the bypass unit of the one of the neighbouring cells.

According to a preferred embodiment of the cell assembly, the cell controller unit of each cell is adapted to provide a control signal to the bypass unit of two of its neighbouring cells, such that the respective bypass unit changes its configuration from the short circuit configuration to the open circuit configuration or from the open circuit configuration to the short circuit configuration. Since the cell controller unit of each cell is adapted to provide a control signal to the bypass unit of two of its neighbouring cells, such that the respective bypass unit changes its configuration from the short circuit configuration to the open circuit configuration or from the open circuit configuration to the short circuit configuration, the cell controller unit of each cell can control the bypass unit of the two of the neighbouring cells of the cell the controller unit is a part of. It is particularly preferred that the bypass unit of each cell is provided with control signals from the cell controller unit of the cell and in addition provided with control signals from the cell controller unit of two neighbouring cells. Therefore, in case the cell controller unit of a cell fails or the communication between the cell controller unit and the bypass unit of the cell or between the main controller unit of the converter and the cell controller unit of the cell is impaired or no longer possible, control signals can be provided by the cell controller unit of the two neighbouring cells of the failed cell to the bypass unit of the failed cell. It is preferred that when the cell controller unit of each cell is adapted to provide a control signal to the bypass unit of two of its neighbouring cells, such that the respective bypass unit changes its configuration from the short circuit configuration to the open circuit configuration or from the open circuit configuration to the short circuit configuration, the power supply unit of each cell is adapted to provide electrical power to the bypass unit of the two neighbouring cells.

According to a preferred embodiment of the cell assembly, the bypass unit of each cell is adapted to bypass one switching element of the switching elements of the cell in the short circuit configuration and to not bypass the one switching element in the open circuit configuration. It is preferred that the bypass unit of each cell is adapted to bypass one switching element of the switching elements of the cell in the short circuit configuration and to not bypass the one switching element in the open circuit configuration in cases when the cell comprises a half-bridge configuration.

According to a preferred embodiment of the cell assembly, the bypass unit of each cell is adapted to bypass two switching elements of the switching elements of the cell in the short circuit configuration and to not bypass the two switching elements in the open circuit configuration. It is preferred that the bypass unit of each cell is adapted to bypass two switching elements of the switching elements of the cell in the short circuit configuration and to not bypass the two switching elements in the open circuit configuration in cases when the cell comprises a full-bridge configuration.

According to a preferred embodiment of the cell assembly, the switching elements of each cell comprise two switching elements, which are connected to one another at a first connection point, which is connected to the first terminal of the cell, wherein a first switching element of the two switching elements is connected to a first terminal of the capacitance and a second switching element of the two switching elements is connected to a second terminal of the capacitance at a second connection point, which is connected to the second terminal of the cell. When the switching elements of each cell comprise two switching elements, which are connected to one another at a first connection point, which is connected to the first terminal of the cell, wherein a first switching element of the two switching elements is connected to a first terminal of the capacitance and a second switching element of the two switching elements is connected to a second terminal of the capacitance at a second connection point, which is connected to the second terminal of the cell, a half-bridge configuration of the cell can be provided.

According to a preferred embodiment of the cell assembly, the switching elements of each cell comprise four switching elements, wherein a first switching element of the four switching elements and a second switching element of the four switching elements are connected to one another at a first connection point, which is connected to the first terminal of the cell, wherein a third switching element of the four switching elements and a fourth switching element of the four switching elements are connected to one another at a second connection point, which is connected to the second terminal of the cell, wherein the first switching element and the third switching element are connected to one another at a third connection point, which is connected to a first terminal of the capacitance of the cell and the second switching element and the fourth switching element are connected to one another at a fourth connection point, which is connected to a second terminal of the capacitance of the cell. When the switching elements of each cell comprise four switching elements, wherein a first switching element of the four switching elements and a second switching element of the four switching elements are connected to one another at a first connection point, which is connected to the first terminal of the cell, wherein a third switching element of the four switching elements and a fourth switching element of the four switching elements are connected to one another at a second connection point, which is connected to the second terminal of the cell, wherein the first switching element and the third switching element are connected to one another at a third connection point, which is connected to a first terminal of the capacitance of the cell and the second switching element and the fourth switching element are connected to one another at a fourth connection point, which is connected to a second terminal of the capacitance of the cell, a full-bridge configuration can be provided.

According to a preferred embodiment of the cell assembly, each switching element of the at least one switching element of each cell comprises a transistor. Further, each switching element of the at least one switching element of each cell may comprise an insulated gate bipolar transistor (IGBT), a metal oxide semiconductor field effect transistor (MOSFET), a high electron mobility transistor (HEMT) and/or a thyristor. Preferably, each switching element of the at least one switching element of each cell is formed of Silicon (Si), Silicon Carbide (SiC) and/or Gallium Arsenide (GAN).

According to a second aspect of the present disclosure, a converter with improved reliability is provided. The converter comprises a plurality of arms. Each arm of the plurality of arms comprises a cell assembly according to the first aspect of the present disclosure.

The converter comprises a plurality of arms. Preferably, the converter comprises three arms. However, it is also preferred that the converter comprises six arms. In any case, the number of arms of the converter can be chosen depending on the application of the converter. Further, the converter may comprise one arm per phase of the converter. Alternatively, the converter may comprise two or more arms per phase of the converter. Preferably, the number of arms per phase, i.e. one arm per phase, two arms per phase or more than two arms per phase, can be chosen depending on the application of the converter. Each arm of the plurality of arms comprises a cell assembly according to the first aspect of the present disclosure.

Preferably, the converter according to the second aspect of the present disclosure is a multi level converter, preferably a modular multilevel converter (MMC). It is particularly preferred that the converter is a three phase modular multilevel converter. Preferably, the converter according to the second aspect of the present disclosure is adapted to convert electric power from high voltage alternating current to high voltage direct current. Further, it is preferred that the converter according to the second aspect of the present disclosure is adapted to convert electric power from high voltage direct current to high voltage alternating current. Further, the converter according to the second aspect of the present disclosure can be adapted to convert electric power from high voltage alternating current to high voltage direct current and from high voltage direct current to high voltage alternating current. In case the converter is adapted to convert electric power from high voltage direct current to high voltage alternating current, from high voltage alternating current to high voltage direct current, or from high voltage alternating current to high voltage direct current and from high voltage direct current to high voltage alternating current, the converter can be referred to as a high voltage alternating current to high voltage direct current (HVDC) converter. Particularly, in embodiments, in which each switching element of the at least one switching element of each cell comprises a transistor, the converter according to the second aspect of the present disclosure can be referred to as a voltage source converter (VSC). It is preferred that the converter according to the second aspect of the present disclosure is adapted for medium voltage (MV) drive applications. In a particularly preferred embodiment of the converter according to the second aspect of the present disclosure, the converter forms a converter of a static synchronous compensator (STATCOM). It is particularly preferred that in case the converter forms a converter of a static synchronous compensator, the static synchronous compensator forms a part of a unified power flow controller (UPFC). In a preferred embodiment, the converter is a single phase modular multilevel converter. In a further preferred embodiment, the converter is a matrix converter.

The features, technical effects and/or advantages described in connection with the first aspect of the present disclosure also apply to the second aspect of the present disclosure at least in an analogous manner, so that no corresponding repetition is made here. Even though the method steps are described in a certain order, implementation forms according to the present disclosure are not restricted to this order. Rather, the individual method steps can be carried out in any meaningful sequence.

Further features, advantages and application possibilities of the present disclosure may be derived from the following description of exemplary embodiments and/or the figures. Thereby, all described and/or visually depicted features for themselves and/or in any combination may form an advantageous subject matter and/or features of the present disclosure independent of their combination in the individual claims or their dependencies. Furthermore, in the figures, same reference signs may indicate same or similar objects.

FIG. 1 shows a section of a first embodiment of a converter 1 comprising six arms 3. Each arm 3 comprises a cell assembly 5 and an inductance 7. Each cell assembly 5 comprises a plurality of cells 9. Each arm 3 is connected to a DC (direct current) terminal 11 of two DC terminals 11 and to an AC (alternating current) terminal 13 of three AC terminals 13. The arms 3 form three arm pairs, wherein each arm pair of the arm pairs comprises a first arm 3 and a second arm 3, wherein the first arm 3 and the second arm 3 are connected to the same AC terminal 13 and to different DC terminals 11. Further, each arm pair is connected to a different AC terminal 13.

Figure 2:
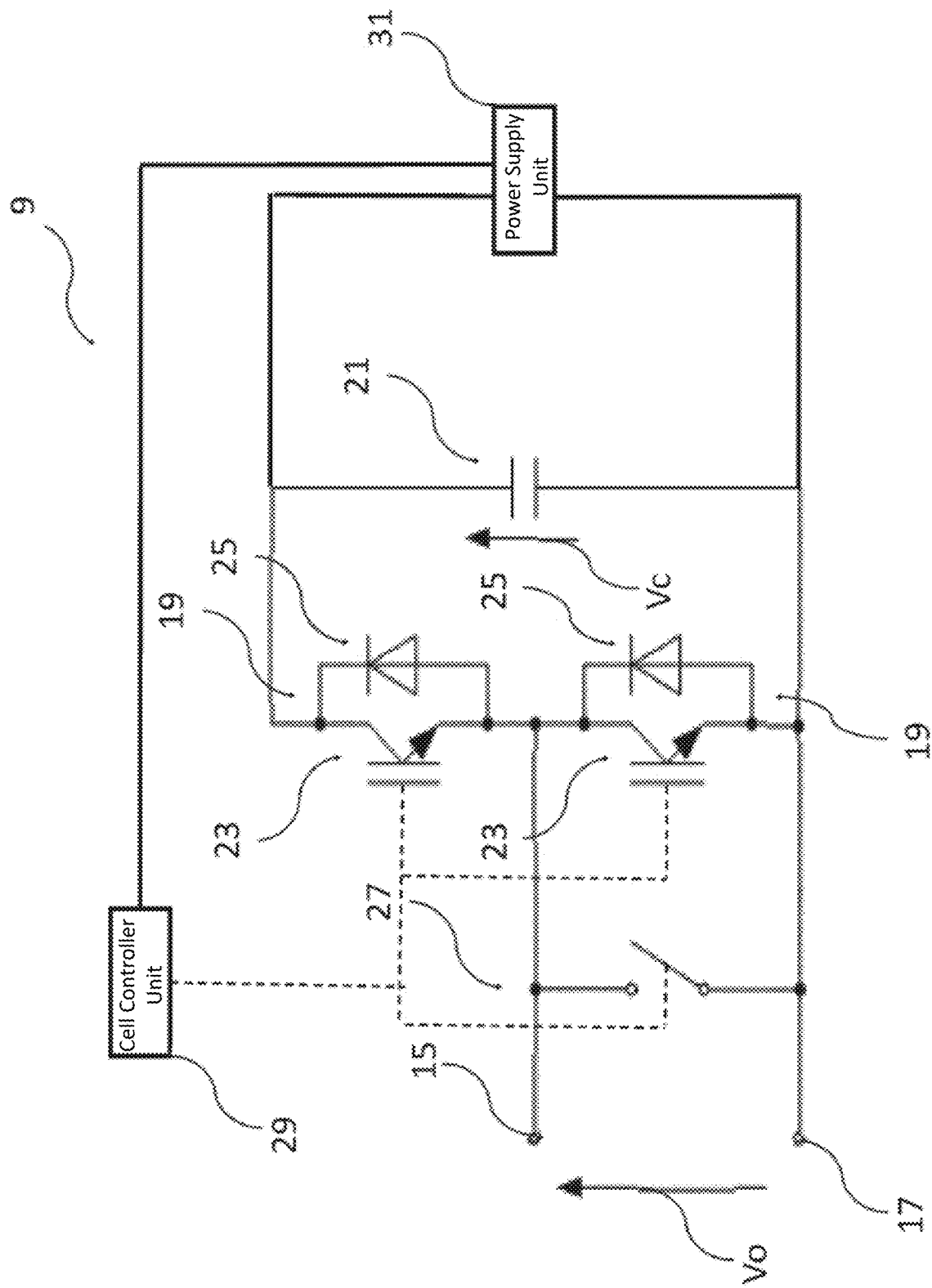
FIG. 2 schematically shows a first embodiment of a cell of a cell assembly of an arm of the plurality of arms of the converter of which a section is shown in FIG. 1.

FIG. 2 shows a first embodiment of a cell 9 of a cell assembly 5 of an arm 3 of the plurality of arms 3 of the converter 1 of which a section is shown in FIG. 1. The cell 9 comprises a first terminal 15 and a second terminal 17. The plurality of cells 9 of each cell assembly 5 shown in FIG. 1 are connected in series in such a way that, for each pair of neighbouring cells 9, the first terminal 15 of a first cell 9 of the pair of neighbouring cells 9 is connected to the second terminal 17 of a second cell 9 of the pair of neighbouring cells 9.

Further, the cell 9 comprises two switching elements 19 and a capacitance 21. The switching elements 19 are adapted to connect the capacitance 21 to the first terminal 15 and to the second terminal 17 and to bypass the capacitance 21, such that a voltage provided by the capacitance Vc can be selectively provided as a cell output voltage Vo by the first terminal 15 and the second terminal 17. Each of the switching elements 19 shown in FIG. 2 comprises an insulated-gate bipolar transistor (IGBT) 23 and a diode 25. The two switching elements 19 are connected to one another at a first connection point. The first connection point is connected to the first terminal 15 of the cell 9. A first switching element 19 of the two switching elements 19 is connected to a first terminal of the capacitance 21 and a second switching element 19 of the two switching elements 19 is connected to a second terminal of the capacitance 21 at a second connection point. The second connection point is connected to the second terminal 17 of the cell 9.

The cell 9 further comprises a bypass unit (bypass) 27. The bypass unit 27 is connected to the first terminal 15 and to the second terminal 17 of the cell 9. Further, the bypass unit 27 is adapted to be in a short circuit configuration and in an open circuit configuration. The bypass unit 27 is adapted to switch back and forth between these two configurations. In the short circuit configuration, the bypass unit 27 bypasses the lower switching element 19 of the two switching elements 19 shown in FIG. 2. In the open circuit configuration, the bypass unit 27 does not bypass the lower switching element 19 of the two switching elements 19 shown in FIG. 2.

Further, the cell 9 comprises a cell controller unit (cell controller) 29. The cell controller unit 29 of the cell 9 is adapted to provide control signals to the switching elements 19 of the cell 9, such that the switching elements 19 connect the capacitance 21 to the first terminal 15 and to the second terminal 17 or the switching elements 19 bypass the capacitance 21. Further, the cell controller unit 29 of the cell 9 is adapted to provide control signals to the bypass unit 27 of the cell 9, such that the bypass unit 27 of the cell 9 changes its configuration from the short circuit configuration to the open circuit configuration or from the open circuit configuration to the short circuit configuration. Further, the cell controller unit 29 of the cell 9 is adapted to provide a control signal to the bypass unit 27 of at least one of its neighbouring cells 9, such that the respective bypass unit 27 changes its configuration from the short circuit configuration to the open circuit configuration or from the open circuit configuration to the short circuit configuration. Particularly, the cell controller unit 29 of the cell 9 may be adapted to provide a control signal to the bypass unit 27 of one of its neighbouring cells 9, such that the respective bypass unit 27 changes its configuration from the short circuit configuration to the open circuit configuration or from the open circuit configuration to the short circuit configuration. Further, the cell controller unit 29 of the cell 9 may alternatively be adapted to provide a control signal to the bypass unit 27 of two of its neighbouring cells 9, such that the respective bypass unit 27 changes its configuration from the short circuit configuration to the open circuit configuration or from the open circuit configuration to the short circuit configuration.

The cell 9 further comprises a power supply unit (power supply) 31. The power supply unit 31 is adapted to provide electrical power to the bypass unit 27 of the cell 9, to the controller unit 29 of the cell 9, and to the capacitance 21 of the cell 9. The power supply unit 31 is further adapted to provide electrical power to the bypass unit 27 of at least one of its neighbouring cells 9.

Figure 3:
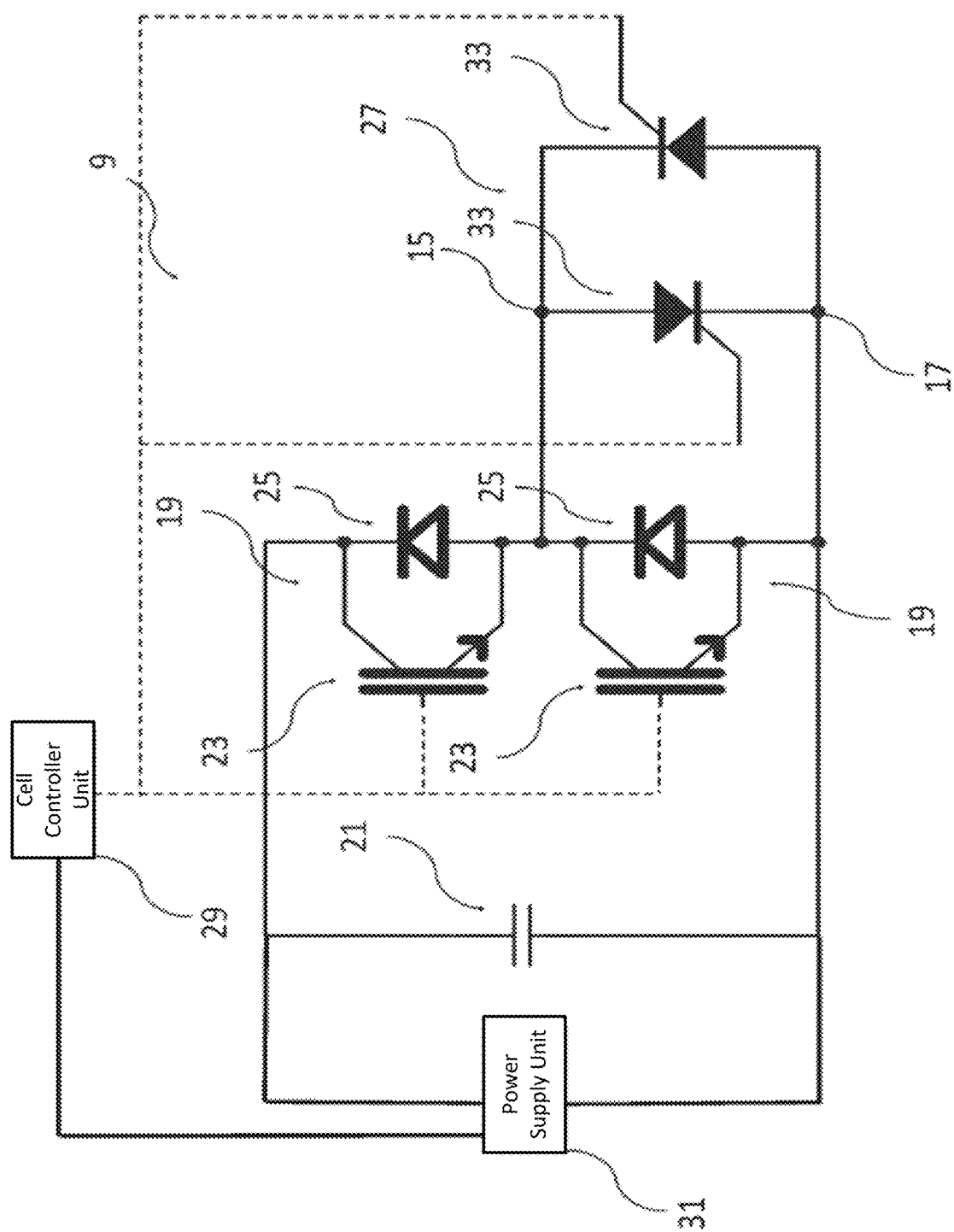
FIG. 3 schematically shows a second embodiment of the cell of the cell assembly of the arm of the plurality of arms of the converter of which a section is shown in FIG. 1.

FIG. 3 shows a second embodiment of the cell 9 of the cell assembly 5 of the arm 3 of the plurality of arms 3 of the converter 1 of which a section is shown in FIG. 1. The second embodiment of the cell 9 shown in FIG. 3 is essentially identical to the first embodiment of the cell 9 shown in FIG. 2. However, the bypass unit 27 of the second embodiment of the cell 9 comprises two thyristors 33. Both thyristors 33 are connected to the first terminal 15 and to the second terminal 17. A first thyristor 33 of the two thyristors 33 is connected with its anode to the first terminal 15 and with its cathode to the second terminal 17. A second thyristor 33 of the two thyristors 33 is connected with its cathode to the first terminal 15 and with its anode to the second terminal 17.

Each thyristor 33 of the two thyristors 33 is adapted to bypass the lower switching element 19 of the two switching elements 19 shown in FIG. 3 in a short circuit configuration and to not bypass the lower switching element 19 in an open circuit configuration. Each thyristor 33 of the two thyristors 33 is adapted to switch back and forth between these two configurations. Due to the two thyristors 33, the bypass unit 27 is adapted to be in a first short circuit configuration, in a second short circuit configuration, and in an open circuit configuration. In the first short circuit configuration of the bypass unit 27, the left thyristor 33 in FIG. 3 is in the short circuit configuration and bypasses the lower switching element 19 and the right thyristor 33 in FIG. 3 is in an open circuit configuration and does not bypass the lower switching element 19. Further, in the second short circuit configuration of the bypass unit 27, the right thyristor 33 in FIG. 3 is in a short circuit configuration and bypasses the lower switching element 19 and the left thyristor 33 in FIG. 3 is in an open circuit configuration and does not bypass the lower switching element 19. Further, in the open circuit configuration of the bypass unit 27, the left thyristor 33 and the right thyristor 33 in FIG. 3 are both in the open circuit configuration and both do not bypass the lower switching element 19. Due to the two thyristors 33, the bypass unit 27 can selectively bypass the lower switching element 19 in two directions, i.e. from the first terminal 15 to the second terminal 17 and from the second terminal 17 to the first terminal 15.

Further, the cell controller unit 29 is connected to the gates of the two thyristors 33 and is adapted to provide control signals to the two thyristors 33, such that the configuration of each of the two thyristors 33 can be changed from the short circuit configuration to the open circuit configuration and from the open circuit configuration to the short circuit configuration. Thereby, the configuration of the bypass unit 27 can be changed from the first short circuit configuration to the second short circuit configuration, from the second short circuit configuration to the first short circuit configuration, from the first short circuit configuration to the open circuit configuration, from the open circuit configuration to the first short circuit configuration, from the second short circuit configuration to the open circuit configuration, and from the open circuit configuration to the second short circuit configuration. Hence, the direction in which the bypass unit 27 bypasses the lower switching element 19 can be controlled.

Figure 4:
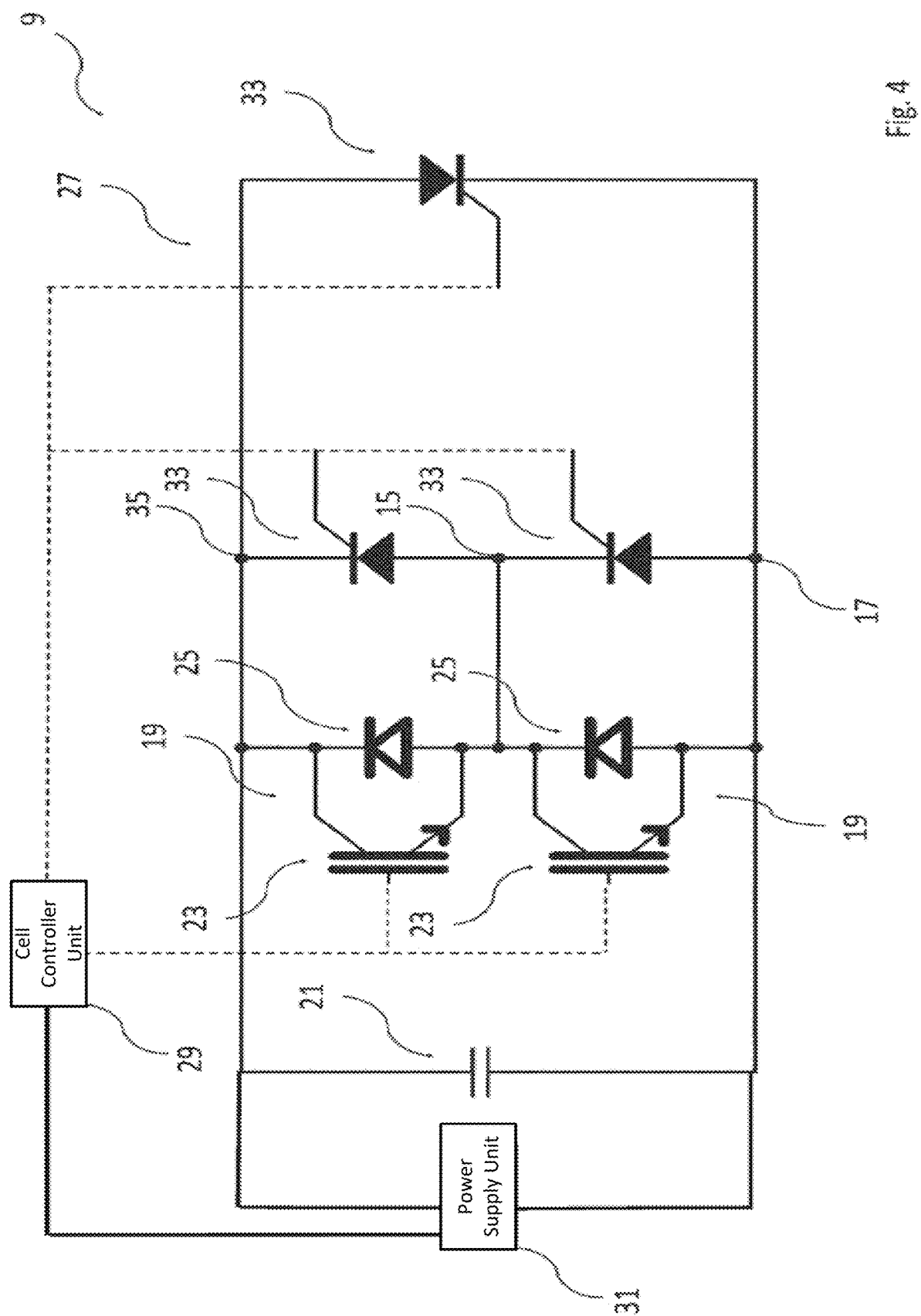
FIG. 4 schematically shows a third embodiment of the cell of the cell assembly of the arm of the plurality of arms of the converter of which a section is shown in FIG. 1.

FIG. 4 shows a third embodiment of the cell 9 of the cell assembly 5 of the arm 3 of the plurality of arms 3 of the converter 1 of which a section is shown in FIG. 1. The third embodiment of the cell 9 shown in FIG. 4 is essentially identical to the first embodiment of the cell 9 shown in FIG. 2. However, the cell 9 comprises the first terminal 15, the second terminal 17, and a third terminal 35, which is connected to the first terminal of the capacitance 21. The first terminal 15 and the second terminal 17 are adapted as described above in connection with the other embodiments. For example, the voltage provided by the capacitance Vc can be selectively provided as a cell output voltage Vo by the first terminal 15 and the second terminal 17. Further, the bypass unit 27 of the third embodiment of the cell 9 comprises three thyristors 33. A first thyristor 33 of the three thyristors 33 is connected to the first terminal 15 of the cell 9 and to the second terminal 17 of the cell 9, a second thyristor 33 of the three thyristors 33 is connected to the first terminal 15 of the cell 9 and to the third terminal 35 of the cell 9, and a third thyristor 33 of the three thyristors 33 is connected to the second terminal 17 of the cell 9 and to the third terminal 35 of the cell 9. The first thyristor 33 is connected with its anode to the second terminal 17 and with its cathode to the first terminal 15. The second thyristor 33 of the three thyristors 33 is connected with its anode to the first terminal 15 and with its cathode to the third terminal 35. The third thyristor 33 of the three thyristors 33 is connected with its anode to the third terminal 35 and with its cathode to the second terminal 17.

Further, the first thyristor 33 is and the second and third thyristors 33 are adapted to bypass the lower switching element 19 of the two switching elements 19 shown in FIG. 4 in a short circuit configuration and to not bypass the lower switching element 19 in an open circuit configuration. The thyristors 33 are adapted to switch back and forth between these configurations. Due to the three thyristors 33, the bypass unit 27 is adapted to be in a first short circuit configuration, in a second short circuit configuration, and in an open circuit configuration. In the first short circuit configuration of the bypass unit 27, the first thyristor 33 in FIG. 4 is in the short circuit configuration and bypasses the lower switching element 19 and the second and third thyristors 33 in FIG. 4 are in an open circuit configuration and do not bypass the lower switching element 19. Further, in the second short circuit configuration of the bypass unit 27, the second and third thyristors 33 in FIG. 4 are in a short circuit configuration and bypasses the lower switching element 19 and the first thyristor 33 in FIG. 4 is in an open circuit configuration and does not bypass the lower switching element 19. Further, in the open circuit configuration of the bypass unit 27, the first, second and third thyristors 33 in FIG. 4 are in the open circuit configuration and do not bypass the lower switching element 19. Due to the three thyristors 33, the bypass unit 27 can selectively bypass the lower switching element 19 in two directions, i.e. from the first terminal 15 to the second terminal 17 and from the second terminal 17 to the first terminal 15.

Further, the cell controller unit 29 is connected to the gates of the three thyristors 33 and is adapted to provide control signals to the three thyristors 33, such that the configuration of each of the three thyristors 33 can be changed from the short circuit configuration to the open circuit configuration and from the open circuit configuration to the short circuit configuration. Thereby, the configuration of the bypass unit 27 can be changed from the first short circuit configuration to the second short circuit configuration, from the second short circuit configuration to the first short circuit configuration, from the first short circuit configuration to the open circuit configuration, from the open circuit configuration to the first short circuit configuration, from the second short circuit configuration to the open circuit configuration, and from the open circuit configuration to the second short circuit configuration. Hence, the direction in which the bypass unit 27 bypasses the lower switching element 19 can be controlled.

Figure 5:
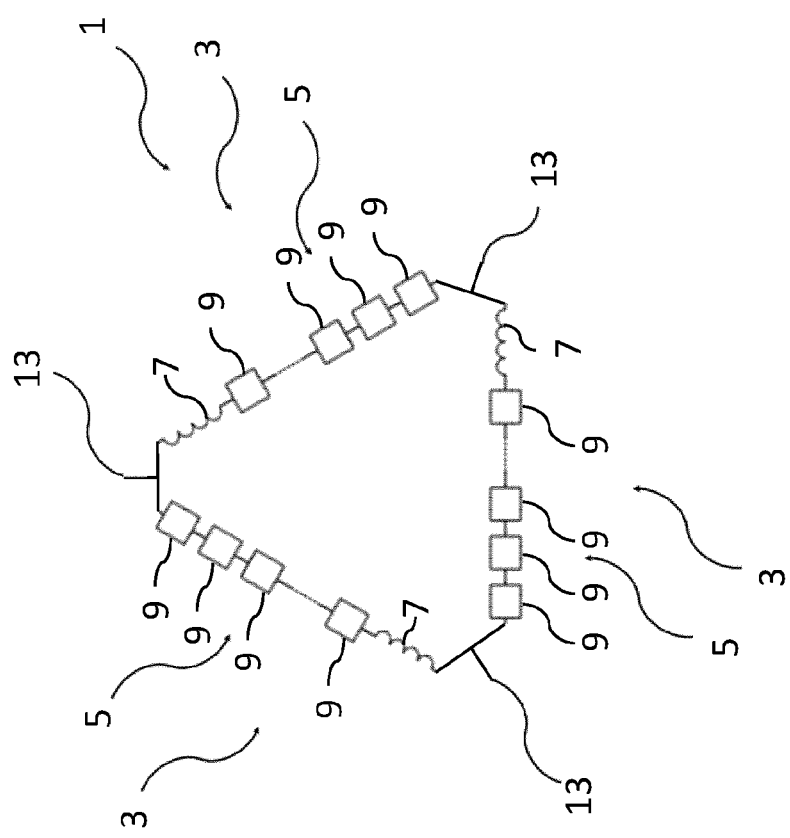
FIG. 5 schematically shows a section of a second embodiment of the converter comprising a plurality of arms.

FIG. 5 shows a section of a second embodiment of the converter 1 comprising three arms 3. Each arm 3 comprises a cell assembly 5 and an inductance 7. Each cell assembly 5 comprises a plurality of cells 9. Each arm 3 is connected to two AC terminals 13 of three AC terminals 13. The arms 3 form three arm pairs, wherein each arm pair of the arm pairs comprises a first arm 3 and a second arm 3, wherein the first arm 3 and the second arm 3 are connected to the same AC terminal 13. Further, each arm pair is connected to a different same AC terminal 13.

Figure 6:
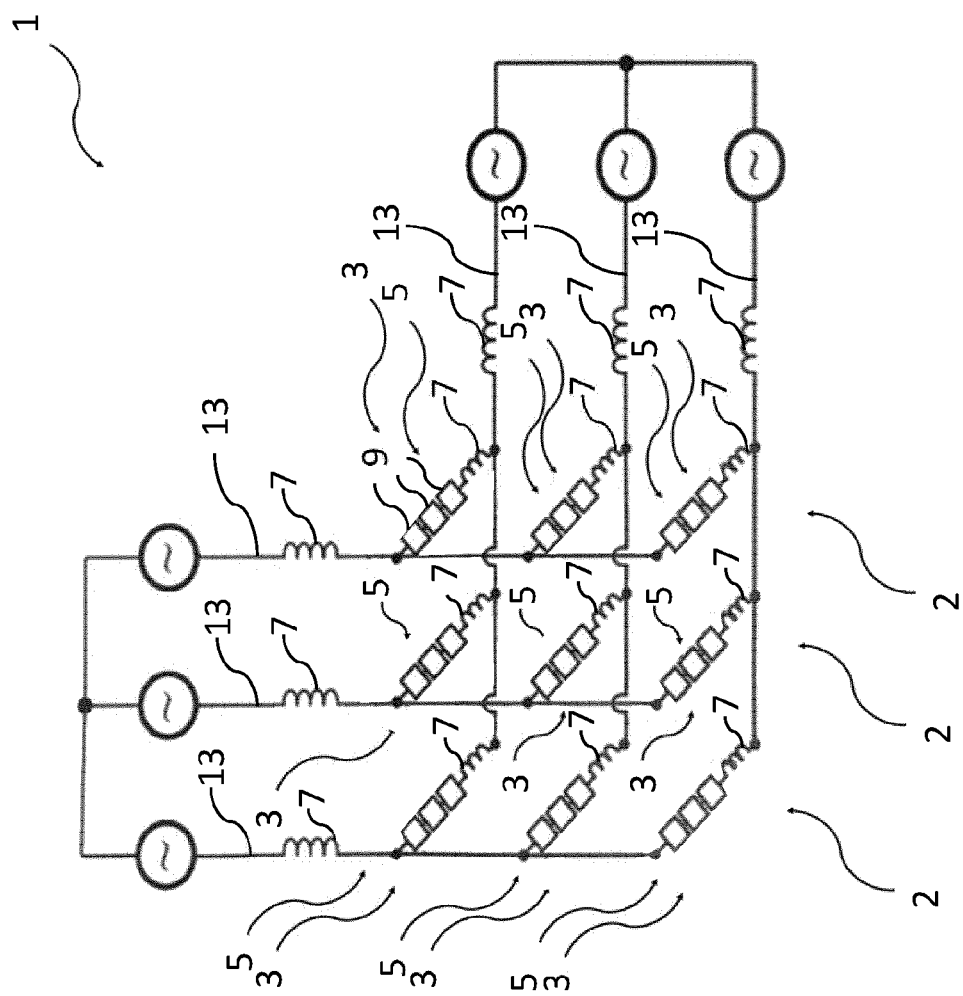
FIG. 6 schematically shows a section of a second embodiment of the converter comprising a plurality of arms.

FIG. 6 shows a section of a third embodiment of the converter 1. The converter comprises three sub-converters 2. Each sub-converter comprises three arms 3. Therefore, the converter 1 can be regarded as comprising nine arms 3. Each arm 3 comprises a cell assembly 5 and an inductance 7. Each cell assembly 5 comprises a plurality of cells 9. Each arm 3 is connected to a first AC terminal 13 of three first AC terminals 13 via an inductance 7 and to a second AC terminal 13 of three second AC terminals 13 via an inductance 7. The arms 3 form three sets of arms, wherein each set of arms comprises three arms 3 and can be regarded as forming a section of one of the three sub-converters 2. The arms 3 of each set of arms are connected to the same first AC terminal 13 and are connected to different second AC terminals 13.

Even though two cells 9 of a pair of cells 9 comprising a first cell 9 of a first cell assembly 5 of a first arm 3 and a second cell 9 of a second cell assembly 5 of a second arm 3 are not connected to each other in series within the same cell assembly 5, the first cell 9 and the second cell 9 may be connected to each other and/or interact with each other in the same way as the cells 9 of a pair of neighbouring cells 9 are connected to each other and/or interact with each other according to the present disclosure. For example, the cell controller unit 29 of the first cell 9 may be adapted to provide a control signal to the bypass unit 27 of the second cell 9, such that the respective bypass unit 27 changes its configuration from the short circuit configuration to the open circuit configuration or from the open circuit configuration to the short circuit configuration. The above may apply to each pair of cells 9 comprising cells 9 not belonging to the same cell assembly 5 and can also apply to each pair of cells 9 belonging to the same cell assembly 5, however, not being neighbouring cells 9. Further, the above may apply to each feature and feature combination, individually and in combination, in connection with two neighbouring cells, and in particular for each embodiment of the present disclosure.

Figure 7:
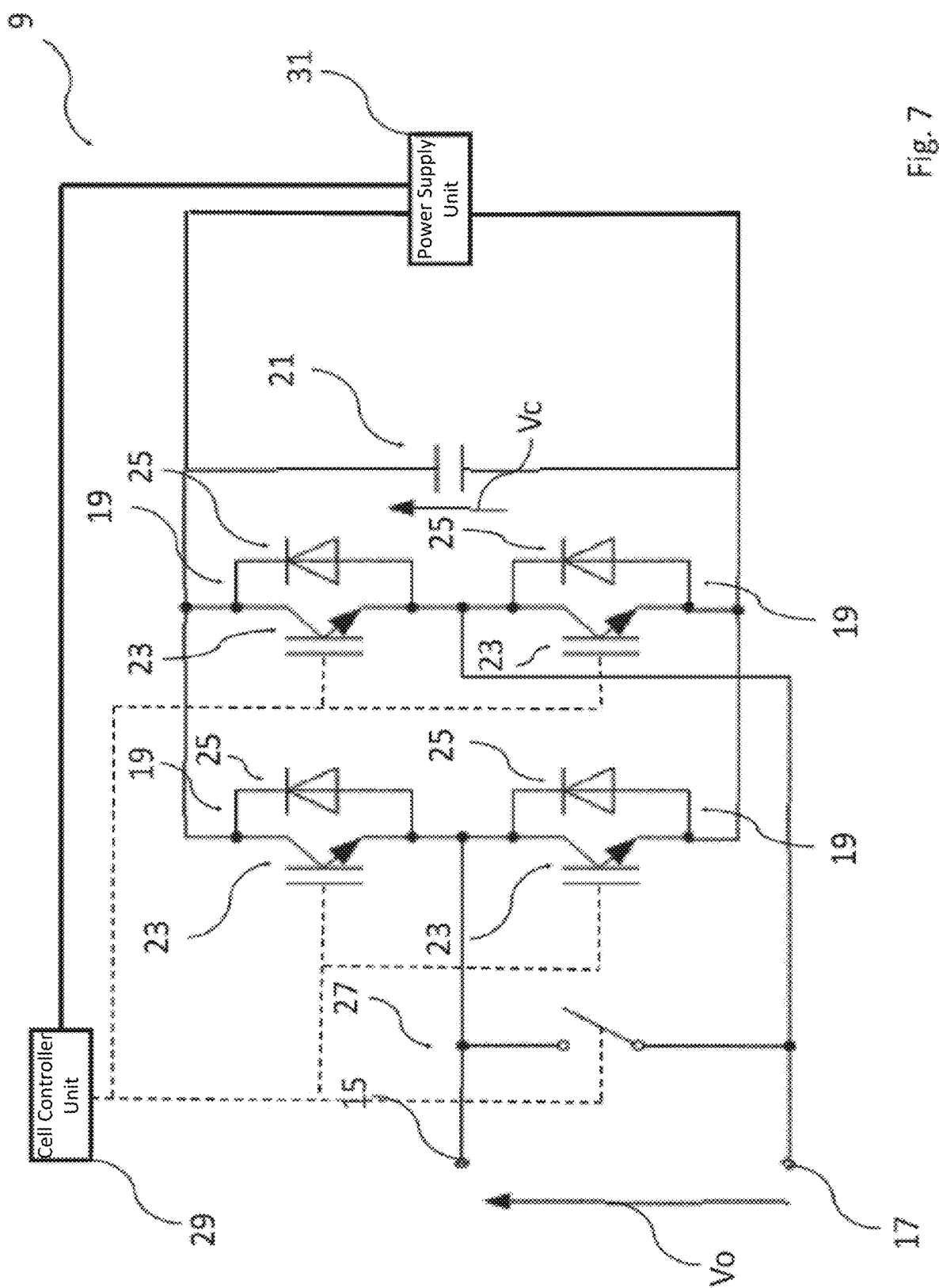
FIG. 7 schematically shows a fourth embodiment of a cell of a cell assembly of an arm of the plurality of arms of the converter of which a section is shown in FIG. 5.

FIG. 7 shows a fourth embodiment of a cell 9 of a cell assembly 5 of an arm 3 of the plurality of arms 3 of the converter 1 of which a section is shown in FIG. 5. The fourth embodiment of the cell 9 shown in FIG. 7 can also form a cell 9 of a cell assembly 5 of an arm 3 of the plurality of arms 3 of the converter 1 of which a section is shown in FIG. 6. The cell 9 comprises the first terminal 15 and the second terminal 17. The plurality of cells 9 of each cell assembly 5 shown in FIG. 5 and in FIG. 6 are connected in series in such a way that, for each pair of neighbouring cells 9, the first terminal 15 of a first cell 9 of the pair of neighbouring cells 9 is connected to the second terminal 17 of a second cell 9 of the pair of neighbouring cells 9.

The cell 9 comprises four switching elements 19 and a capacitance 21. The switching elements 19 are adapted to connect the capacitance 21 to the first terminal 15 and to the second terminal 17 and to bypass the capacitance 21, such that a voltage provided by the capacitance Vc can be selectively provided as a cell output voltage Vo by the first terminal 15 and the second terminal 17. Compared to the first embodiment of the cell 9 shown in FIG. 2, the four switching elements 19 are adapted to connect the capacitance 21 to the first terminal 15 and to the second terminal 17 such that the voltage provided by the capacitance Vc can be selectively provided as the cell output voltage Vo by the first terminal 15 and the second terminal 17, particularly with alternating polarity. For example, Vo may successively be equal to Vc and −Vc.

Each of the switching elements 19 shown in FIG. 7 comprises an IGBT 23 and a diode 25. A first switching element 19 of the four switching elements 19 and a second switching element 19 of the four switching elements 19 are connected to one another at a first connection point. The first connection point is connected to the first terminal 15 of the cell 9. The first switching element 19 is connected to the first terminal of the capacitance 21 and the second switching element 19 is connected to the second terminal of the capacitance 21. A third switching element 19 of the four switching elements 19 and a fourth switching element 19 of the four switching elements 19 are connected to one another at a second connection point. The second connection point is connected to the second terminal 17 of the cell 9. The third switching element 19 is connected to the first terminal of the capacitance 21 and the fourth switching element 19 is connected to the second terminal of the capacitance 21. The first switching element 19 and the third switching element 19 are connected to one another at a third connection point, which is connected to the first terminal of the capacitance 21. The second switching element 19 and the fourth switching element 19 are connected to one another at a fourth connection point, which is connected to the second terminal of the capacitance 21.

The cell 9 further comprises a bypass unit 27. The bypass unit 27 is connected to the first terminal 15 and to the second terminal 17. Further, the bypass unit 27 is adapted to be in a short circuit configuration and in an open circuit configuration. The bypass unit 27 is adapted to switch back and forth between these two configurations. In the short circuit configuration, the bypass unit 27 bypasses the first and third switching elements 19 as well as the second and fourth switching elements 19 shown in FIG. 7. In the open circuit configuration, the bypass unit 27 does not bypass the first, second, third, and fourth switching elements 19.

Further, the cell 9 comprises a cell controller unit 29. The cell controller unit 29 of the cell 9 is adapted to provide control signals to the switching elements 19 of the cell 9, such that the switching elements 19 connect the capacitance 21 to the first terminal 15 and to the second terminal 17 or the switching elements 19 bypass the capacitance 21. Further, the cell controller unit 29 of the cell 9 is adapted to provide control signals to the bypass unit 27 of the cell 9, such that the bypass unit 27 of the cell 9 changes its configuration from the short circuit configuration to the open circuit configuration or from the open circuit configuration to the short circuit configuration. Further, the cell controller unit 29 of the cell 9 is adapted to provide control signals to the bypass unit 27 of at least one of its neighbouring cells 9, such that the respective bypass unit 27 changes its configuration from the short circuit configuration to the open circuit configuration or from the open circuit configuration to the short circuit configuration. Particularly, the cell controller unit 29 of the cell 9 may be adapted to provide control signals to the bypass unit 27 of one of its neighbouring cells 9, such that the respective bypass unit 27 changes its configuration from the short circuit configuration to the open circuit configuration or from the open circuit configuration to the short circuit configuration. Further, the cell controller unit 29 of the cell 9 may alternatively be adapted to provide control signals to the bypass unit 27 of two of its neighbouring cells 9, such that the respective bypass unit 27 changes its configuration from the short circuit configuration to the open circuit configuration or from the open circuit configuration to the short circuit configuration.

The cell 9 further comprises a power supply unit 31. The power supply unit 31 is adapted to provide electrical power to the bypass unit 27 of the cell 9, to the controller unit 29 of the cell 9, and to the capacitance 21 of the cell 9. The power supply unit 31 is further adapted to provide electrical power to the bypass unit 27 of at least one of its neighbouring cells 9.

Figure 8:
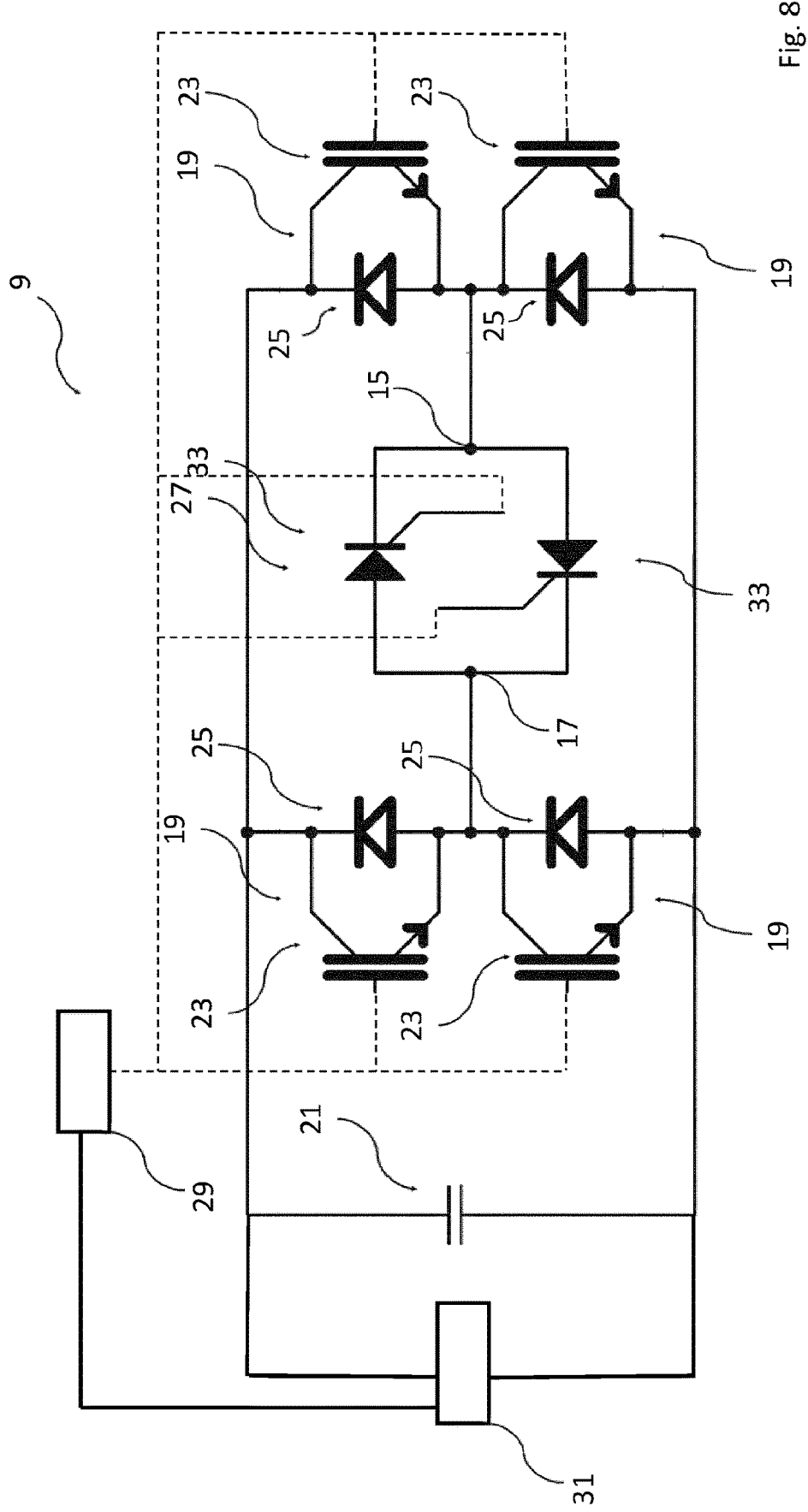
FIG. 8 schematically shows a fifth embodiment of the cell of the cell assembly of the arm of the plurality of arms of the converter of which a section is shown in FIG. 5.

FIG. 8 shows a fifth embodiment of the cell 9 of the cell assembly 5 of the arm 3 of the plurality of arms 3 of the converter 1 of which a section is shown in FIG. 5. The fifth embodiment of the cell 9 shown in FIG. 8 can also form a cell 9 of a cell assembly 5 of an arm 3 of the plurality of arms 3 of the converter 1 of which a section is shown in FIG. 6. The fifth embodiment of the cell 9 shown in FIG. 8 is essentially identical to the fourth embodiment of the cell 9 shown in FIG. 7. However, the bypass unit 27 of the fifth embodiment of the cell 9 comprises two thyristors 33. Both thyristors 33 are connected to the first terminal 15 and to the second terminal 17. A first thyristor 33 of the two thyristors 33 is connected with its anode to the first terminal 15 and with its cathode to the second terminal 17. A second thyristor 33 of the two thyristors 33 is connected with its cathode to the first terminal 15 and with its anode to the second terminal 17.

Each thyristor 33 is adapted to be in a short circuit configuration, in which the thyristor 33 bypasses the first and third switching elements 19 as well as the second and fourth switching elements 19. Further, each thyristor 33 is adapted to be in an open circuit configuration, in which the thyristor 33 does not bypass the first, second, third, and fourth switching elements 19. Each thyristor 33 is adapted to switch back and forth between the short circuit configuration and the open circuit configuration.

Due to the two thyristors 33, the bypass unit 27 is adapted to be in a first short circuit configuration, in a second short circuit configuration, and in an open circuit configuration. In the first short circuit configuration of the bypass unit 27, the first thyristor 33 in FIG. 8 is in the short circuit configuration and bypasses the first, second, third, and fourth switching elements 19 and the second thyristor 33 in FIG. 8 is in an open circuit configuration and does not bypass the first, second, third, and fourth switching elements 19. Further, in the second short circuit configuration of the bypass unit 27, the second thyristor 33 in FIG. 8 is in a short circuit configuration and bypasses the first, second, third, and fourth switching elements 19 and the first thyristor 33 in FIG. 8 is in an open circuit configuration and does not bypass the first, second, third, and fourth switching elements 19. Further, in the open circuit configuration of the bypass unit 27, the first thyristor 33 and the second thyristor 33 in FIG. 8 are both in the open circuit configuration and both do not bypass the first, second, third, and fourth switching elements 19. Due to the two thyristors 33, the bypass unit 27 can selectively bypass the first, second, third, and fourth switching elements 19 in two directions, i.e. from the first terminal 15 to the second terminal 17 and from the second terminal 17 to the first terminal 15.

Further, with respect to FIG. 8, the cell controller unit 29 is connected to the gates of the two thyristors 33 and is adapted to provide control signals to the two thyristors 33, such that the configuration of each of the two thyristors 33 can be changed from the short circuit configuration to the open circuit configuration and from the open circuit configuration to the short circuit configuration. Thereby, the configuration of the bypass unit 27 can be changed from the first short circuit configuration to the second short circuit configuration, from the second short circuit configuration to the first short circuit configuration, from the first short circuit configuration to the open circuit configuration, from the open circuit configuration to the first short circuit configuration, from the second short circuit configuration to the open circuit configuration, and from the open circuit configuration to the second short circuit configuration. Hence, the direction in which the bypass unit 27 bypasses the first, second, third, and fourth switching elements 19 can be controlled.

Figure 9:
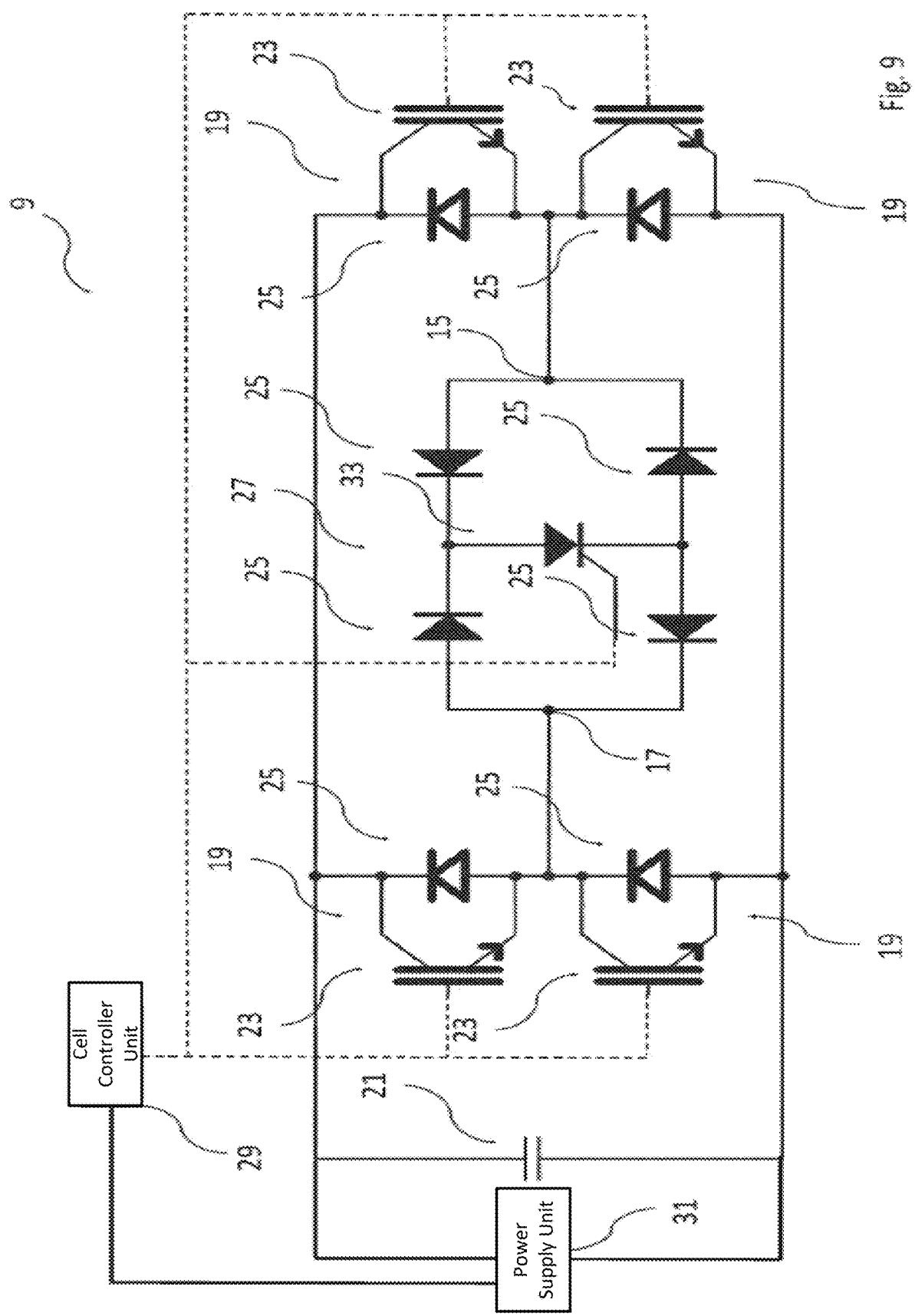
FIG. 9 schematically shows a sixth embodiment of the cell of the cell assembly of the arm of the plurality of arms of the converter of which a section is shown in FIG. 5.

FIG. 9 shows a sixth embodiment of the cell 9 of the cell assembly 5 of the arm 3 of the plurality of arms 3 of the converter 1 of which a section is shown in FIG. 5. The fifth embodiment of the cell 9 shown in FIG. 9 can also form a cell 9 of a cell assembly 5 of an arm 3 of the plurality of arms 3 of the converter 1 of which a section is shown in FIG. 6. The sixth embodiment of the cell 9 shown in FIG. 9 is essentially identical to the fifth embodiment of the cell 9 shown in FIG. 8. However, the bypass unit 27 of the sixth embodiment of the cell 9 comprises a thyristor 33 and four diodes 25. A first diode 25 of the four diodes 25 and a second diode 25 of the four diodes 25 are connected to the first terminal 15 and on opposite sides to the thyristor 33. A third diode 25 of the four diodes 25 and a fourth diode 25 of the four diodes 25 are connected to the second terminal 17 and on opposite sides to the thyristor 33. The first diode 25 is connected with its anode to the first terminal 15 and with its cathode to the anode of the thyristor 33. The second diode 25 is connected with its cathode to the first terminal 15 and with its anode to the cathode of the thyristor 33. The third diode 25 is connected with its cathode to the second terminal 17 and with its anode to the cathode of the thyristor 33. The fourth diode 25 is connected with its anode to the second terminal 17 and with its cathode to the anode of the Thyristor 33.

The thyristor 33 is adapted to be in a short circuit configuration and in an open circuit configuration and is adapted to switch back and forth between the short circuit configuration and the open circuit configuration. When the thyristor 33 is in the short circuit configuration, the bypass unit 27 is also in the short circuit configuration and bypasses the first, second, third, and fourth switching elements 19. Particularly, due to the arrangement of the four diodes 25 and the thyristor 33, when the bypass unit 27 is in the short circuit configuration, the bypass unit 27 can bypass the first, second, third, and fourth switching elements 19 in two directions, i.e. from the first terminal 15 to the second terminal 17 and from the second terminal 17 to the first terminal 15. Preferably, the direction of the bypassing depends on the voltage present at the first terminal 15 and the second terminal 17. When the thyristor 33 is in the open circuit configuration, the bypass unit 27 is also in the open circuit configuration and does not bypass the first, second, third, and fourth switching elements 19.

Further, the cell controller unit 29 is connected to the gate of the thyristor 33 and is adapted to provide control signals to the thyristor 33, such that the configuration of the thyristor 33 can be changed from the short circuit configuration to the open circuit configuration and from the open circuit configuration to the short circuit configuration. Thereby, the configuration of the bypass unit 27 can be changed from the short circuit configuration to the open circuit configuration. Hence, configuration of the bypass unit 27 can be controlled by only controlling the thyristor 33. Therefore, the bypass unit 27 shown in FIG. 9 provides a bypass unit 27, which is easy and energy efficient to control. Further, the bypass unit 27 shown in FIG. 9 only requires one thyristor 33.

Figure 10:
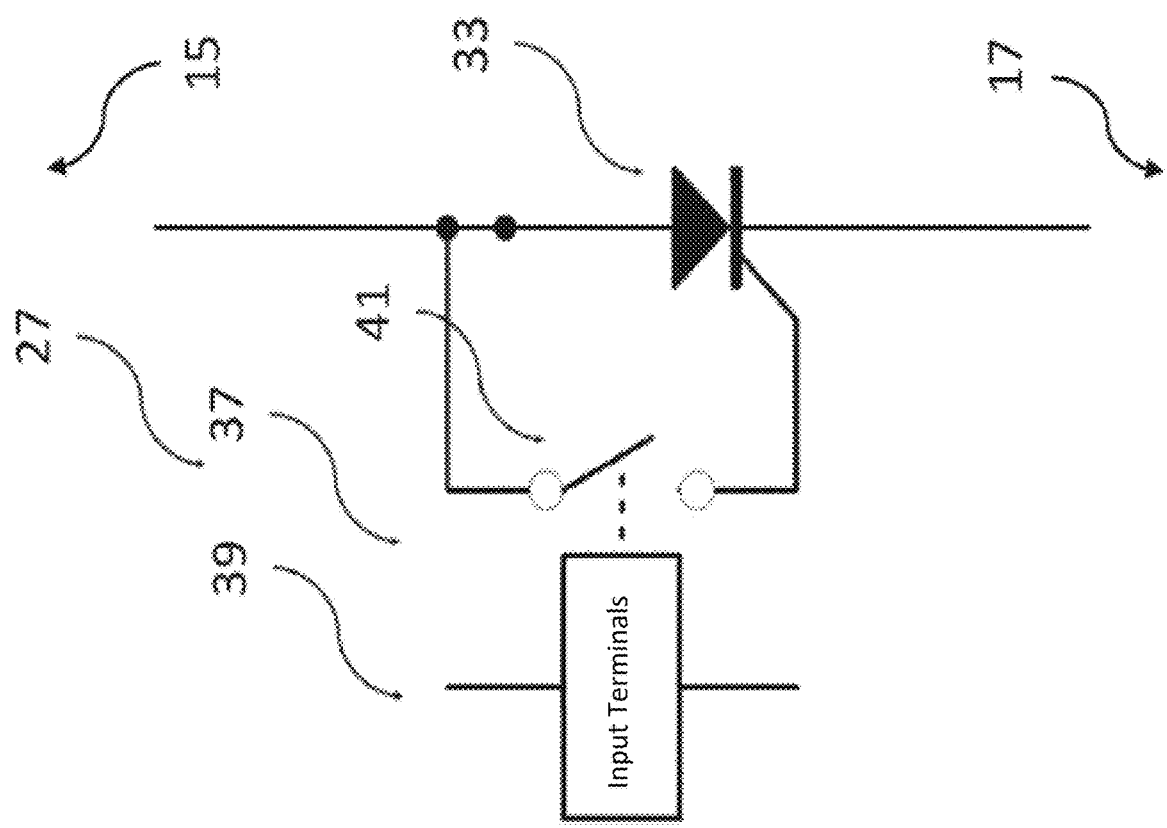
FIG. 10 schematically shows a section of a first embodiment of a bypass unit of the first to sixth embodiment of the cell shown in FIGS. 2 to 4 and FIGS. 7 to 9.

FIG. 10 shows a section of a first embodiment of a bypass unit 27 of the first to sixth embodiment of the cell 9 shown in FIGS. 2 to 4 and 7 to 9. The thyristor 33 shown in FIG. 10 may be any thyristor 33 shown in FIGS. 3, 4, 8, and 9. The cell controller unit 29 is connected to the gate of the thyristor 33 via a latching relay 37, which may form a memory unit (memory) or a part of a memory unit and which comprises input terminals 39 adapted to receive control signals from the cell controller unit 29 and normally open contact terminals 41 adapted to be in an open configuration and in a closed configuration and changed from the open configuration to the closed configuration and from the closed configuration to the open configuration depending on the control signals received from the cell controller unit 29, such that the configuration of the thyristor 33 can be changed from the short circuit configuration to the open circuit configuration and from the open circuit configuration to the short circuit configuration.

Figure 11:
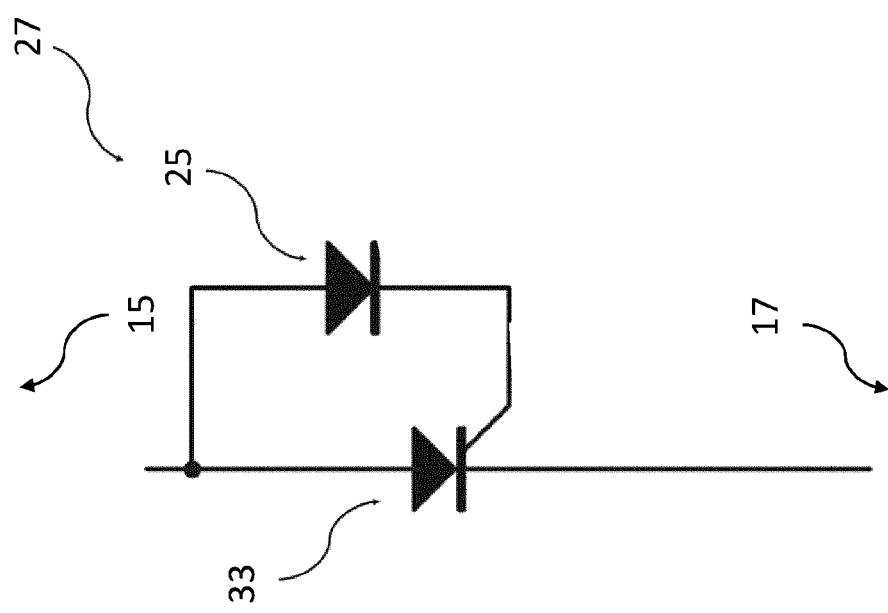
FIG. 11 schematically shows a section of a second embodiment of the bypass unit of the first to sixth embodiment of the cell shown in FIGS. 2 to 4 and FIGS. 7 to 9.

FIG. 11 shows a section of a second embodiment of the bypass unit 27 of the first to sixth embodiment of the cell 9 shown in FIGS. 2 to 4 and 7 to 9. The thyristor 33 shown in FIG. 11 may be any thyristor 33 shown in FIGS. 3, 4, 8, and 9. A diode 25 is connected to the thyristor 33, wherein the anode of the diode 25 is connected to the anode of the thyristor 33 and the cathode of the diode 25 is connected to the gate of the thyristor 33. Due to this configuration, the thyristor 33 may act as a diode in case the bypass unit 27 needs to be forced into the short circuit configuration, for example in case of a bond wire failure of a diode 25 of one of the switching elements 19.

Figure 12:
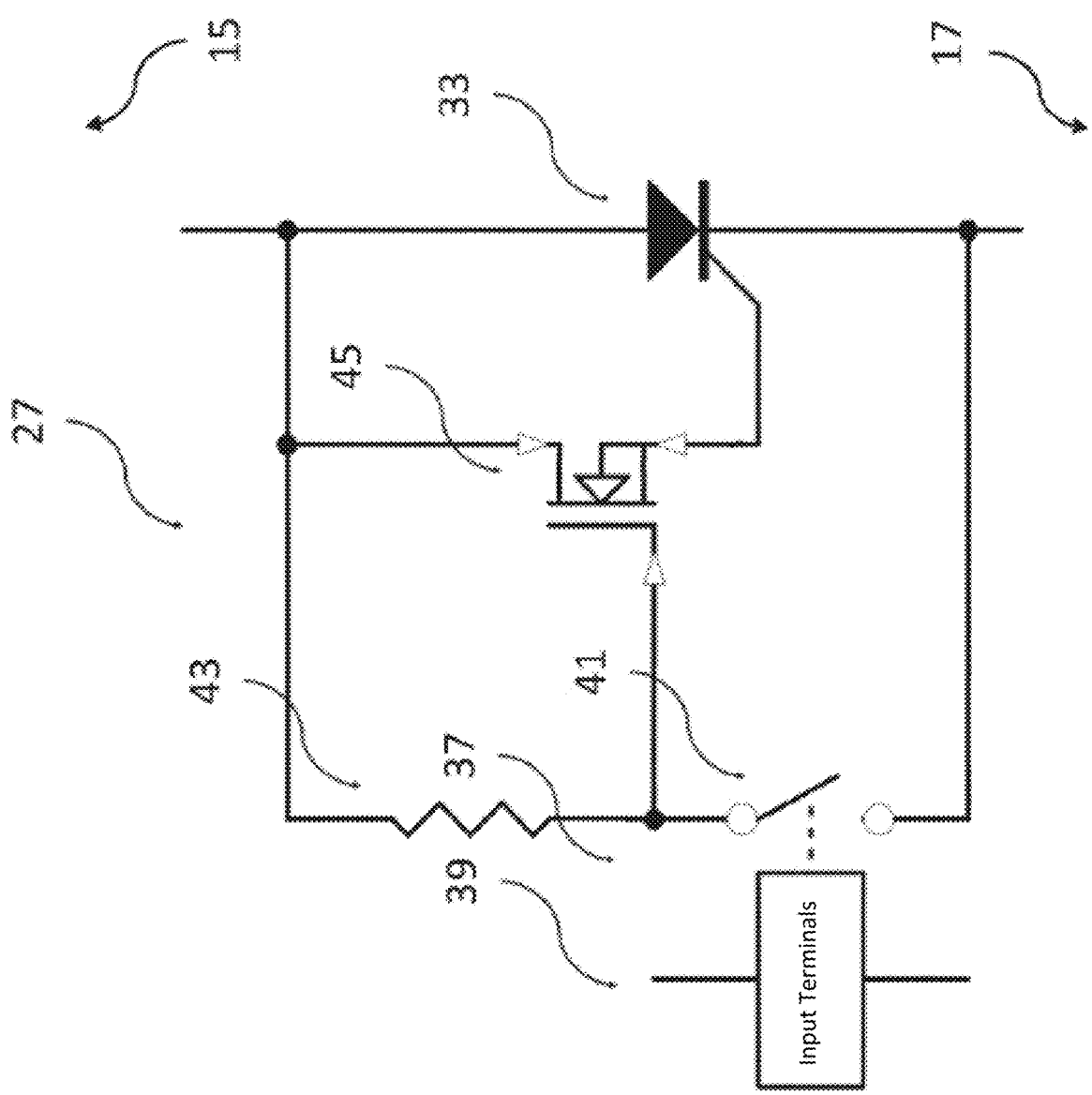
FIG. 12 schematically shows a section of a third embodiment of the bypass unit of the first to sixth embodiment of the cell shown in FIGS. 2 to 4 and FIGS. 7 to 9.

FIG. 12 shows a section of a third embodiment of the bypass unit 27 of the first to sixth embodiment of the cell 9 shown in FIGS. 2 to 4 and 7 to 9. The thyristor 33 shown in FIG. 12 may be any thyristor 33 shown in FIGS. 3, 4, 8, and 9. The cell controller unit 29 is connected to the gate of the thyristor 33 via a latching relay 37, which may form a memory unit or a part of a memory unit, a resistance 43, which may be formed by a resistor, and an n-channel metal oxide semiconductor field-effect transistor (n-channel MOSFET) 45. The latching relay 37 comprises input terminals 39 adapted to receive control signals from the cell controller unit 29 and normally open contact terminals 41 adapted to be in an open configuration and in a closed configuration and adapted to be changed from the open configuration to the closed configuration and from the closed configuration to the open configuration depending on the control signals received from the cell controller unit 29, such that the configuration of the thyristor 33 can be changed from the short circuit configuration to the open circuit configuration and from the open circuit configuration to the short circuit configuration. To change the configuration of the thyristor 33, the latching relay 37 is connected to the thyristor 33 via the resistance 43 and the n-channel MOSFET 45. A first contact terminal of the contact terminals 41 is connected to the cathode of the thyristor 33. A second contact terminal of the contact terminals 41 is connected to a first terminal of the resistance 43 and a gate of the n-channel MOSFET 45. A second terminal of the resistance 43 is connected to a drain of the n-channel MOSFET 45 and to the anode of the thyristor 33. Further, a source of the n-channel MOSFET 45 is connected to the gate of the thyristor 33, such that the configuration of the thyristor 33 can be changed from the short circuit configuration to the open circuit configuration and from the open circuit configuration to the short circuit configuration based on the control signals received from the cell controller unit 29 at the latching relay 37.

Figure 13:
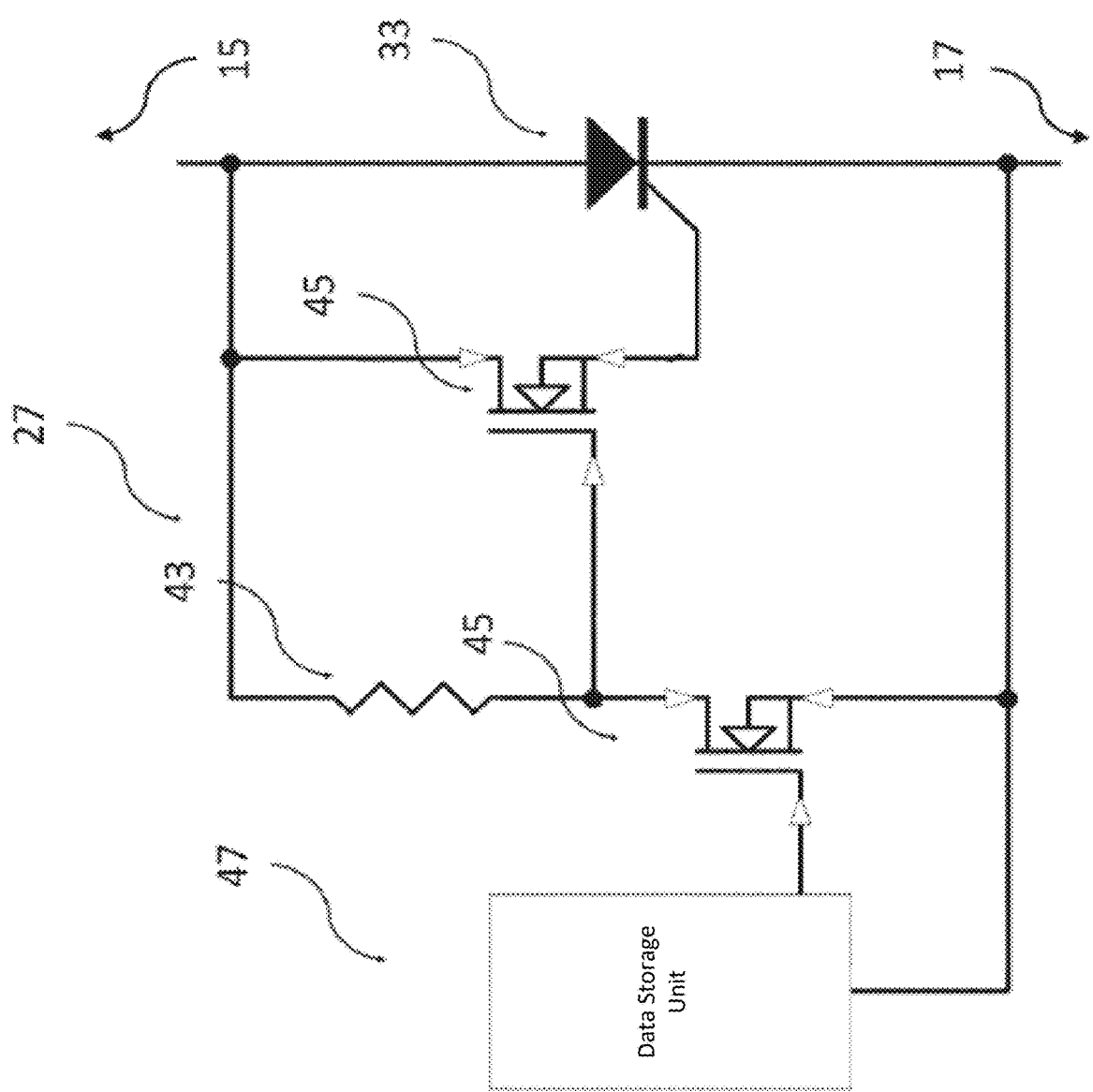
FIG. 13 schematically shows a section of a fourth embodiment of the bypass unit of the first to sixth embodiment of the cell shown in FIGS. 2 to 4 and FIGS. 7 to 9.

FIG. 13 shows a section of a fourth embodiment of the bypass unit 27 of the first to sixth embodiment of the cell 9 shown in FIGS. 2 to 4 and 7 to 9. The thyristor 33 shown in FIG. 13 may be any thyristor 33 shown in FIGS. 3, 4, 8, and 9. The cell controller unit 29 is connected to the gate of the thyristor 33 via a memory unit, which comprises a data storage unit 47, a resistance 43, which may be formed by a resistor, and two n-channel MOSFETs 45. To change the configuration of the thyristor 33 from the short circuit configuration to the open circuit configuration and from the open circuit configuration to the short circuit configuration, the memory unit is connected to the thyristor 33 via the resistance 43 and the two n-channel MOSFET 45. A first terminal of the memory unit is connected to a source of a first n-channel MOSFET 45 of the two n-channel MOSFETs 45 and to the cathode of the thyristor 33. A second terminal of the memory unit is connected to a gate of the first n-channel MOSFET 45. A drain of the first n-channel MOSFET 45 is connected to the first terminal of the resistance 43 and a gate of a second n-channel MOSFET 45 of the two n-channel MOSFETs 45. A second terminal of the resistance 43 is connected to a drain of the second n-channel MOSFET 45 and to the anode of the thyristor 33. Further, a source of the second n-channel MOSFET 45 is connected to the gate of the thyristor 33, such that the configuration of the thyristor 33 can be changed from the short circuit configuration to the open circuit configuration and from the open circuit configuration to the short circuit configuration based on the control signals received from the cell controller unit 29 at the memory unit.

The control signals received from the cell controller unit 29 may represent status information, which can be written to the data storage unit 47 of the memory unit by the cell controller unit 29 of the cell 9. Preferably, the data storage unit 47 is a non-volatile data storage unit. The status information may represent the configuration of the bypass unit 27, particularly the current configuration of the bypass unit 27 and/or the desired configuration of the bypass unit 27, and/or the configuration of the thyristor 33, particularly the current configuration of the thyristor 33 and/or the desired configuration of the thyristor 33. In case the status information may represent the configuration of the bypass unit 27, the status information may also be called status information of the bypass unit 27. In case the status information may represent the configuration of the thyristor 33, the status information may also be called status information of the thyristor 33. The current configuration of the bypass unit 27 is the configuration in which the bypass unit 27 is currently in. Similarly, the current configuration of the thyristor 33 is the configuration in which the thyristor 33 is currently in. The desired configuration of the bypass unit 27 may be the configuration in which the bypass unit 27 needs to be in, such that the at least one switching element 19 of the switching elements 19 is bypassed or not bypassed. The desired configuration of the thyristor 33 may be the configuration in which the thyristor 33 needs to be in, such that the bypass unit 27 is in its desired configuration.

Figure 14:
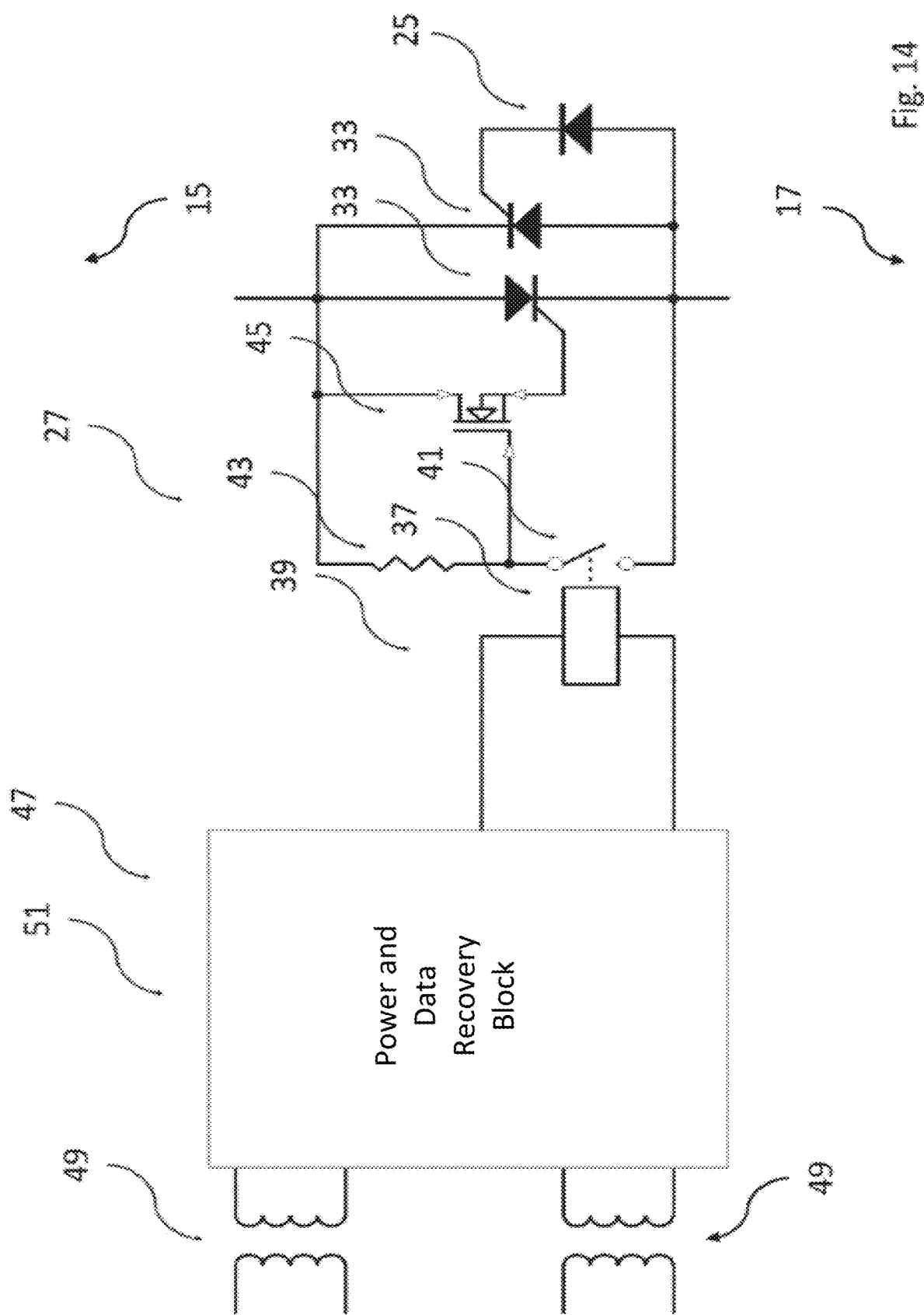
FIG. 14 schematically shows a section of a fifth embodiment of the bypass unit of the first to sixth embodiment of the cell shown in FIGS. 2 to 4 and FIGS. 7 to 9.

FIG. 14 shows a section of a fifth embodiment of the bypass unit 27 of the first to sixth embodiment of the cell 9 shown in FIGS. 2 to 4 and 7 to 9. The fifth embodiment of the bypass unit 27 shown in FIG. 14 is essentially identical to the third embodiment of the bypass unit 27 shown in FIG. 12.

A first thyristor 33 shown on the left in FIG. 12 may be any thyristor 33 shown in FIGS. 3, 4, 8, and 9. The cell controller unit 29 not shown in FIG. 14 is connected to the gate of the first thyristor 33 via a latching relay 37, which may form a memory unit or a part of a memory unit, a resistance 43, which may be formed by a resistor, and an n-channel MOSFET 45. The latching relay 37 comprises input terminals 39 adapted to receive control signals from the cell controller unit 29 and normally open contact terminals 41 adapted to be in an open configuration and in a closed configuration and adapted to be changed from the open configuration to the closed configuration and from the closed configuration to the open configuration depending on the control signals received from the cell controller unit 29, such that the configuration of the first thyristor 33 can be changed from the short circuit configuration to the open circuit configuration and from the open circuit configuration to the short circuit configuration. To change the configuration of the first thyristor 33, the latching relay 37 is connected to the first thyristor 33 via the resistance 43 and the n-channel MOSFET 45. A first contact terminal of the contact terminals 41 is connected to the cathode of the first thyristor 33. A second contact terminal of the contract terminals 41 is connected to a first terminal of the resistance 43 and a gate of the n-channel MOSFET 45. A second terminal of the resistance 43 is connected to a drain of the n-channel MOSFET 45 and to the anode of the first thyristor 33. Further, a source of the n-channel MOSFET 45 is connected to the gate of the first thyristor 33, such that the configuration of the first thyristor 33 can be changed from the short circuit configuration to the open circuit configuration and from the open circuit configuration to the short circuit configuration based on the control signals received from the cell controller unit 29 at the latching relay 37.

Further, the bypass unit 27 comprises a second thyristor 33 shown on the right in FIG. 14. The anode of the second thyristor 33 is connected to the cathode of the first thyristor 33 and the cathode of the second thyristor 33 is connected to the anode of the first thyristor 33. The bypass unit 27 comprises a diode 25, which is connected to the second thyristor 33. The anode of the diode 25 is connected to the cathode of the first thyristor 33 and to the anode of the second thyristor 33. Further, the cathode of the diode 25 is connected to the gate of the second thyristor 33. Due to this configuration, the second thyristor 33 may act as a diode in case the bypass unit 27 needs to be forced into the short circuit configuration, for example in case of a bond wire failure of a diode 25 of one of the switching elements 19.

Further, a first transformer 49 and a second transformer 49 are shown in FIG. 14. The first transformer 49 and the second transformer 49 are each connected to a power and data recovery block 51 of the bypass unit 27. Further, the first transformer 49 is connected to a first neighbouring cell 9 of the cell 9 the bypass unit 27 is a part of and the second transformer 49 is connected to a second neighbouring cell 9 of the cell 9 the bypass unit 27 is a part of. The cell 9 and the first neighbouring cell 9 form a pair of neighbouring cells 9. Similarly, the cell 9 and the second neighbouring cell 9 form a pair of neighbouring cells 9. The power and data recovery block 51 comprises output terminals, which are connected to the input terminals 39 of the latching relay 37.

The first neighbouring cell 9 comprises a cell controller unit 29, which is adapted to provide a control signal to the bypass unit 27 of which a section is shown in FIG. 14 via the first transformer 49. The power and data recovery block 51 comprises input terminals adapted to receive control signals from the cell controller unit 29 of the first neighbouring cell 9 via the first transformer 49. The latching relay 37 receives control signals from the power and data recovery block 51 depending on the control signals the power and data recovery block 51 receives from the cell controller unit 29 of the first neighbouring cell 9, such that the configuration of the first thyristor 33 can be changed from the short circuit configuration to the open circuit configuration and from the open circuit configuration to the short circuit configuration depending on the control signals the power and data recovery block 51 receives from the cell controller unit 29 of the first neighbouring cell 9. Therefore, the cell controller unit 29 of the first neighbouring cell 9 is adapted to provide control signals to the bypass unit 27 of which a section is shown in FIG. 14, such that the bypass unit 27 changes its configuration from the short circuit configuration to the open circuit configuration or from the open circuit configuration to the short circuit configuration. Further, the first neighbouring cell 9 comprises a power supply unit 31. The power supply unit 31 of the first neighbouring cell 9 is adapted to provide electrical power to the bypass unit 27 via the first transformer 49.

Moreover, the second neighbouring cell 9 comprises a cell controller unit 29, which is adapted to provide a control signal to the bypass unit 27 of which a section is shown in FIG. 14 via the second transformer 49. The input terminals of the power and data recovery block 51 are also adapted to receive control signals from the cell controller unit 29 of the second neighbouring cell 9 via the second transformer 49. The latching relay 37 receives control signals from the power and data recovery block 51 depending on the control signals the power and data recovery block 51 receives from the cell controller unit 29 of the second neighbouring cell 9, such that the configuration of the first thyristor 33 can be changed from the short circuit configuration to the open circuit configuration and from the open circuit configuration to the short circuit configuration depending on the control signals the power and data recovery block 51 receives from the cell controller unit 29 of the second neighbouring cell 9. Therefore, the cell controller unit 29 of the second neighbouring cell 9 is adapted to provide control signals to the bypass unit 27 of which a section is shown in FIG. 14, such that the bypass unit 27 changes its configuration from the short circuit configuration to the open circuit configuration or from the open circuit configuration to the short circuit configuration. Further, the second neighbouring cell 9 comprises a power supply unit 31. The power supply unit 31 of the second neighbouring cell 9 is adapted to provide electrical power to the bypass unit 27 via the second transformer 49.

In summary, the bypass unit 27 of which a section is shown in FIG. 14 can be controlled by the cell controller unit 29 of the first neighbouring cell 9 and by the cell controller unit 29 of the second neighbouring cell 9. Further, the power supply unit 31 of the first neighbouring cell 9 and the power supply unit 31 of the second neighbouring cell 9 are both adapted to provide electrical power to the bypass unit 27 of which a section is shown in FIG. 14. Hence, the control of the bypass unit 27 and the power supply of the bypass unit 27 is ensured even if the cell controller unit 29 and/or the power supply unit 31 of the cell 9 the bypass unit 27 is a part of has/have failed in case of a cell failure. Additionally, the control of the bypass unit 27 and the power supply of the bypass unit 27 is still ensured even if the cell controller unit 29 and/or the power supply unit 31 of the cell 9 the bypass unit 27 is a part of has/have failed in case of a cell failure as well as the cell controller unit 29 and/or the power supply unit 31 of either the first neighbouring cell 9 or the second neighbouring cell 9 has/have failed in case of a cell failure of the first or second neighbouring cell 9.

It is additionally pointed out that "comprising" does not rule out other elements, and "a" or "an" does not rule out a multiplicity. It is also pointed out that features that have been described with reference to one of the above exemplary embodiments may also be disclosed as in combination with other features of other exemplary embodiments described above. Reference signs in the claims are not to be regarded as restrictive.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

REFERENCE SIGNS 1 converter
3 arm
5 cell assembly
7 inductance
9 cell
11 DC (direct current) terminal
13 AC (alternating current) terminal
15 first terminal of the cell
17 second terminal of the cell
19 switching element
21 capacitance of the cell
23 insulated-gate bipolar transistor (IGBT)
25 diode
27 bypass unit
29 cell controller unit
31 power supply unit
33 thyristor
35 third terminal of the cell
37 latching relay
39 input terminals
41 contact terminals
43 resistance
45 N-channel MOSFET
47 data storage unit
49 transformer
51 power and data recovery block

The invention claimed is:

1. A modular multilevel converter (MMC) comprising a plurality of arms, wherein each arm comprises a respective cell assembly, the cell assembly comprising a plurality of cells,
   wherein each cell of the plurality of cells comprises: a first terminal, a second terminal, switching elements, and a capacitor, wherein the switching elements are adapted to controllably: connect the capacitor to the first terminal and to the second terminal and bypass the capacitor,
   wherein the cells of the plurality of cells are connected in series in such a way that, for each pair of neighbouring cells, the first terminal of a first cell of the pair of neighbouring cells is connected to the second terminal of a second cell of the pair of neighbouring cells,
   wherein each cell further comprises a bypass unit, wherein the bypass unit of each cell is connected to the first terminal and to the second terminal of the cell and adapted to controllably bypass at least one switching element of the switching elements of the cell in a short circuit configuration and to not bypass the at least one switching element in an open circuit configuration,
   wherein each cell further comprises a cell controller, wherein the cell controller of each cell is adapted to provide control signals to the switching elements of the cell, such that the switching elements controllably connect the capacitor to the first terminal and to the second terminal or the switching elements bypass the capacitor,
   wherein the cell controller of each cell is adapted to provide a control signal to the bypass unit of at least one of its neighbouring cells, such that the respective bypass unit controllably changes its configuration from the short circuit configuration to the open circuit configuration or from the open circuit configuration to the short circuit configuration, wherein the bypass unit of each cell comprises at least one thyristor, wherein each cell further comprises a power supply, wherein the power supply of each cell is adapted to provide electrical power to the bypass unit of at least one of its neighbouring cells, wherein the cell controller of each cell is connected to a gate of the thyristor of at least one of its neighbouring cells via an n-channel metal-oxide semiconductor field-effect transistor (MOSFET), and wherein the cell controller is adapted to provide control signals to the thyristor via the gate for switching between the open and closed configuration.

2. The MMC according to claim 1, wherein the bypass unit of each cell comprises a memory.

3. The MMC according to claim 2, wherein the memory of each cell is connected to the cell controller of the cell, such that a status information of the bypass unit, which represents the configuration of the bypass unit, is writable to the memory by the cell controller of the cell.

4. The MMC according to claim 2, wherein the memory comprises a data storage.

5. The MMC according to claim 4, wherein the data storage is a non-volatile data storage.

6. The MMC according to claim 2, wherein the memory comprises a latching relay.

7. The MMC according to claim 1, wherein the cell controller of each cell is adapted to provide a control signal to the bypass unit of one of its neighbouring cells, such that the respective bypass unit changes its configuration from the short circuit configuration to the open circuit configuration or from the open circuit configuration to the short circuit configuration.

8. The MMC according to claim 1, wherein the cell controller of each cell is adapted to provide a control signal to the bypass unit of two of its neighbouring cells, such that the respective bypass unit changes its configuration from the short circuit configuration to the open circuit configuration or from the open circuit configuration to the short circuit configuration.

9. The MMC according to claim 1, wherein the bypass unit of each cell is adapted to bypass one switching element of the switching elements of the cell in the short circuit configuration and to not bypass the one switching element in the open circuit configuration.

10. The MMC according to claim 1, wherein the bypass unit of each cell is adapted to bypass two switching elements of the switching elements of the cell in the short circuit configuration and to not bypass the two switching elements in the open circuit configuration.

11. The MMC according to claim 1, wherein the switching elements of each cell comprise two switching elements, which are connected to one another at a first connection point, which is connected to the first terminal of the cell, wherein a first switching element of the two switching elements is connected to a first terminal of the capacitor and a second switching element of the two switching elements is connected to a second terminal of the capacitor at a second connection point, which is connected to the second terminal of the cell.

12. The MMC according to claim 1, wherein the switching elements of each cell comprise four switching elements, wherein a first switching element of the four switching elements and a second switching element of the four switching elements are connected to one another at a first connection point, which is connected to the first terminal of the cell, wherein a third switching element of the four switching elements and a fourth switching element of the four switching elements are connected to one another at a second connection point, which is connected to the second terminal of the cell, wherein the first switching element and the third switching element are connected to one another at a third connection point, which is connected to a first terminal of the capacitor of the cell and the second switching element and the fourth switching element are connected to one another at a fourth connection point, which is connected to a second terminal of the capacitor of the cell.

13. The MMC according to claim 1, wherein each switching element of the at least one switching element of each cell comprises a transistor.

14. A modular multilevel converter (MMC) comprising a plurality of arms, wherein each arm comprises a respective cell assembly each configured according to the cell assembly of claim 1.

* * * * *